(12) United States Patent
Saidenberg et al.

(10) Patent No.: US 7,343,550 B2
(45) Date of Patent: Mar. 11, 2008

(54) SYSTEM AND METHOD FOR PROVIDING ON-LINE SERVICES FOR MULTIPLE ENTITIES

(75) Inventors: Steven D. Saidenberg, New York, NY (US); Andrew K. Park, Englewood Cliffs, NJ (US); John C. Marsh, Ridgewood, NJ (US); Dominick Messano, Rockaway, NJ (US); John D. Petersen, North Arlington, NJ (US)

(73) Assignee: UBS Painewebber, Inc., Weehawken, NJ (US)

( * ) Notice: Subject to any disclaimer, the term of this patent is extended or adjusted under 35 U.S.C. 154(b) by 595 days.

(21) Appl. No.: 10/184,124

(22) Filed: Jun. 28, 2002

(65) Prior Publication Data

US 2004/0003347 A1   Jan. 1, 2004

(51) Int. Cl.
*G06N 3/00* (2006.01)
(52) U.S. Cl. .................................................... 715/500
(58) Field of Classification Search ................ 715/500, 715/513, 517, 804, 523, 530; 707/102, 104.1
See application file for complete search history.

(56) References Cited

U.S. PATENT DOCUMENTS

| | | | |
|---|---|---|---|
| 5,864,871 A * | 1/1999 | Kitain et al. ............. | 707/104.1 |
| 5,983,227 A | 11/1999 | Nazem et al. ................ | 707/10 |
| 6,085,229 A | 7/2000 | Newman et al. ............ | 709/203 |
| 6,112,192 A | 8/2000 | Capek .......................... | 705/59 |
| 6,185,608 B1 | 2/2001 | Hon et al. ................... | 709/216 |
| 6,226,648 B1 * | 5/2001 | Appleman et al. .......... | 707/102 |
| 6,732,332 B1 * | 5/2004 | Borysewicz et al. ........ | 715/513 |
| 6,826,744 B1 * | 11/2004 | McAuley ..................... | 717/108 |
| 2001/0007991 A1 | 7/2001 | Tobin | |

* cited by examiner

*Primary Examiner*—Stephen Hong
*Assistant Examiner*—Kyle R Stork
(74) *Attorney, Agent, or Firm*—Proskauer Rose LLP

(57) ABSTRACT

A system and method for determining a set of applications that can be accessed by a group or constituency of entitled users from among the applications associated with a server system. The system may provide a common look and feel for the applications accessed by a particular group or constituency based on an identification subentity code. Applications are informed of the constituency group associated with the user to cause application of particular business logic in conjunction with the entitled applications.

12 Claims, 10 Drawing Sheets

Copyright 2001-2002 UBS PaineWebber Inc. All rights reserved.

900

Copyright 2001-2002 UBS PaineWebber Inc. All rights reserved.

Copyright 2001-2002 UBS PaineWebber Inc. All rights reserved.

Copyright 2001-2002 UBS PaineWebber Inc. All rights reserved.

SYSTEM AND METHOD FOR PROVIDING ON-LINE SERVICES FOR MULTIPLE ENTITIES

This disclosure contains information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND OF THE INVENTION

1. Field of the Invention

The present invention relates to server systems and, more specifically, to systems and methods for selecting applications accessible by a group of users.

2. General Background and Description of Related Art

A given discrete business unit will often have a need for an Internet presence associated with that unit. For example, a business unit may need or desire to provide a World Wide Web (web) portal associated with the business unit that customers, employees, investors, or other on-line users may access to obtain information about the business unit or its products/services. Such business units may include standalone corporations as well as subsidiaries or related corporate entities comprising individual business units having a common parent organization. A financial services provider, for example, may have separate business units for correspondent services, corporate employee financial services, and global prime broker services. Over time, an entity (for example, a corporation) may form or acquire additional business units that could also benefit from an Internet presence.

Provision of Internet services requires hardware, software, and personnel resources at considerable effort and expense. For example, providing a web site may require the development of several interactive linked pages, the format and content for which must be designed and implemented by software professionals drawn from internal resources or engaged as outside services. Running the web site may require computing and communications bandwidth on a server system, which may either be acquired through capital expenditure and administered internally, or leased or rented from an external web hosting service, for example.

The Internet services provided by a business unit may include one or more applications that are accessed by a group of users from a host server. The group of users entitled to access the applications associated with a particular business unit may form a constituency of that business unit. However, for each business unit to provide its own independent Internet access for its constituents to its application or applications may be problematic. For example, to provide Internet services for individual business units can require independent web site development and administration, with the attendant web site costs being borne independently and additively by each business unit.

Furthermore, difficulties may arise in maintaining the strength of the branding for a single entity when each of the Internet services associated with the multiple business units of a single entity must be separately developed and administered to present a uniform look and feel.

SUMMARY OF THE INVENTION

At least one embodiment of the present invention may provide a system and method for determining a set of applications that can be accessed by a group, or constituency of users, from among the applications associated with a server system. These embodiments may determine surfacing branding and applications entitlements based upon user constituencies as identified by a particular subentity code. Based on profiles maintained for each entity code and subentity code, a user may receive entitlements to a set of applications associated with the user's constituency. Upon login, the user may be presented with the branding (logos, style sheets, disclaimers) appropriate for that constituency and presented with navigation options to the entitled applications. In this manner, suites of applications can be redeployed as appropriate to various user communities. Furthermore, applications may be informed of the constituency group of the user to cause application of particular business logic in conjunction with the entitled applications.

At least one embodiments of the present invention may thereby permit a single server system, such as a web server, or a pre-existing server system, to support Internet services for multiple business units including newly formed or acquired business units. These embodiments may reduce the costs required to provide Internet services for multiple business units. The embodiments allow for sharing of computing and communications resources across multiple business units while providing a common look and feel for certain aspects of the user interface with a set of entitled applications for a particular constituency. The embodiments may also serve as a proxy service provider to a constituency.

In such an embodiment, the server system may further include a customization module configured to determine a style for the interactive pages based upon the entity code and the subentity code associated with the constituency to which the requesting user belongs, and may also include a user interface module configured to generate the interactive pages according to the style indicated by the customization module. The customization module may determine a common portion of the style based on the entity code, and may also determine a subentity unique portion of the style based on the subentity code. The customization module may modify the style in response to user unique page parameters based on a user identifier. The customization module may generate a default set of entitled applications if the database is unavailable. The user interface module may accept user modifications to the page parameters and store the updated parameters in the database. The interactive pages may include at least shared pages and subentity pages.

In at least one embodiment, the method may also include determining a common portion of the style based on the entity code and determining a subentity unique portion of the style based on the subentity code. The method may also include modifying the style in response to user unique page parameters based on a user identifier. In some embodiments, the method may also include generating a default set of entitled applications if the database is unavailable. The method may also include accepting user modifications to the page parameters and storing the updated parameters in the database. The interactive pages may include at least shared pages and subentity pages.

BRIEF DESCRIPTION OF THE DRAWINGS

Utility of the embodiments of the invention will be readily appreciated and understood from consideration of the following detailed description of the embodiments of this invention, when taken with the accompanying drawings, in which same numbered elements are identical and.

DETAILED DESCRIPTION

Figure 1:
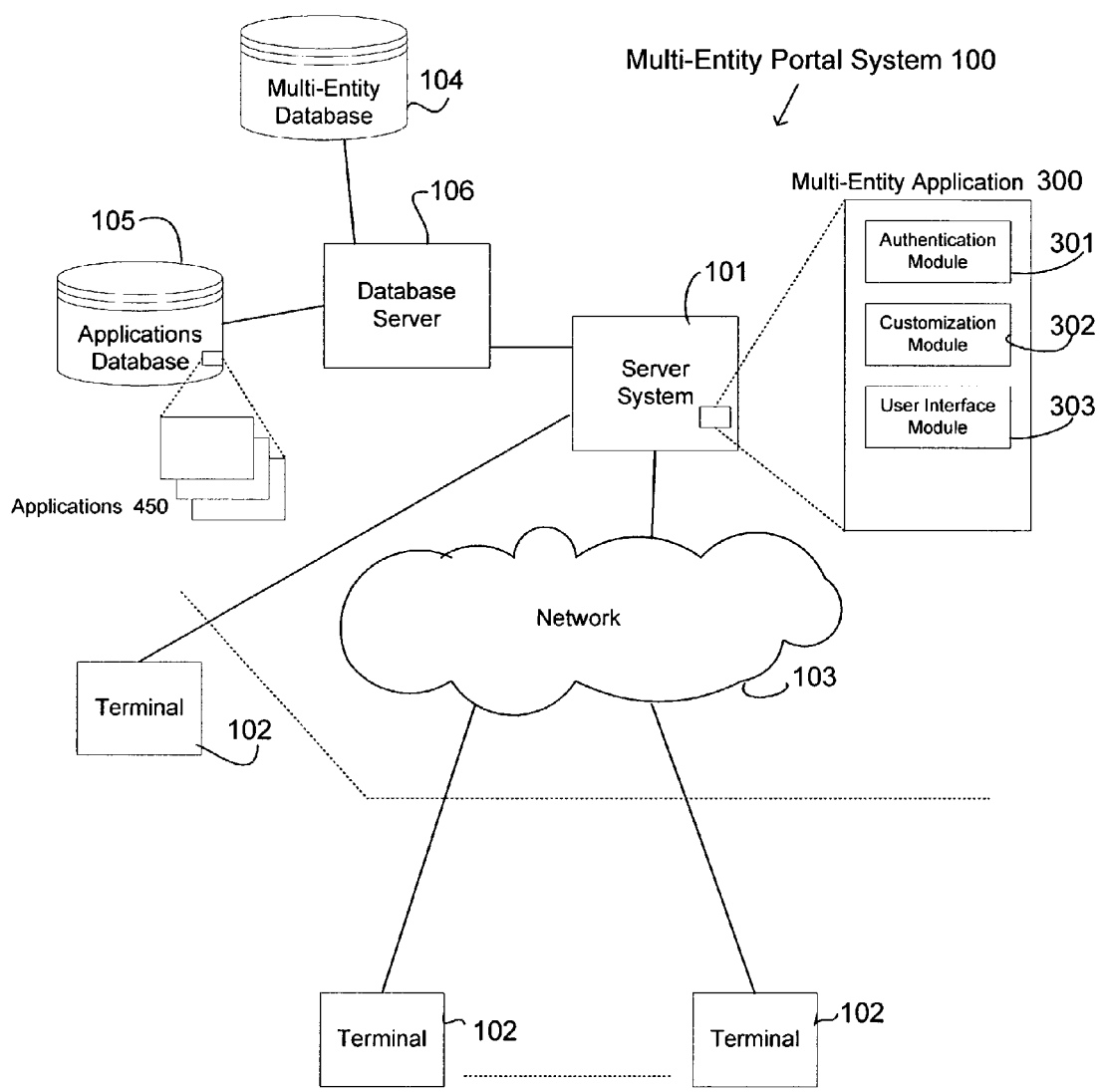
FIG. 1 illustrates at least one embodiment of a multientity portal system in accordance with the present invention.

Embodiments of the present invention may provide a system and method for determining a set of applications that can be accessed by a group, or constituency of users, from among the applications associated with a server system based on an identifier such as, but not limited to, a subentity code. These embodiments may determine surfacing branding and applications entitlements based upon user constituencies as identified by a particular subentity code. Based upon profiles maintained for each entity code and subentity code, a user may receive entitlements to a set of applications associated with the user's constituency. Upon login, the user may be presented with the branding (logos, style sheets, disclaimers) appropriate for that constituency and presented with navigation options to the entitled applications. In this manner, suites of applications can be served or redeployed as appropriate to various user communities. Furthermore, applications may be informed of the constituency group of the user to cause application of particular business logic in conjunction with the entitled applications.

In particular, at least one embodiment may provide a system for providing Internet service to multiple constituencies. Such an embodiment may include a server system, which may have multiple application programs and may be coupled to a network that communicates with at least one terminal. A database may also be coupled to the server system and may store at least one of an entity code and one or more subentity codes as well as a user identifier associated with a particular user. Each user identifier may be associated with a constituency, and each constituency may be associated with one subentity code using the database. In addition, the server system may determine a particular set of entitled applications and a set of business rules based upon the subentity code, and may also provide user access only to the entitled set of applications. Furthermore, the server system may output interactive pages associated with the entitled set of applications to a user at a terminal.

At least one embodiment may also include a method for serving multiple entities on-line. Such a method may include storing, using a database, at least one of an entity code and one or more subentity codes, each subentity code being associated with one entity code. Each user may be associated with at least one subentity code. Such a method may also include selecting a set of applications to which the user is entitled based on subentity code, propagating the subentity code among the entitled applications, determining a set of business rules to be applied in conjunction with the entitled applications based on subentity code, generating one or more interactive pages associated with the entitled applications and in accordance with the determined set of business rules, and outputting the interactive pages to a user at a terminal. In at least one embodiment, the method may also include associating a user identifier with each user, associating each user identifier with a constituency, and associating each constituency with a subentity code. The method may also include determining a style for the interactive pages based upon the entity code and the subentity code associated with the constituency to which the requesting user belongs, and generating the interactive pages according to the style thus determined.

At least one embodiment may also include a system for providing proxy Internet service to multiple constituencies. Such an embodiment may include a server system that has multiple software applications and is coupled to a network that communicates with at least one terminal. A database may also be coupled to the server system to store at least one of an entity code and one or more subentity codes, as well as a user identifier associated with a particular user. Each user identifier may be associated with a constituency and each constituency may be associated with one subentity code that identifies a service. Each entity may be associated with a third party service provider using the database. In at least one embodiment, the server system may output interactive pages associated with the entitled set of applications to a user at a terminal. A customization module may be included to determine a style for interactive pages based upon the entity code and the subentity code associated with the constituency to which the requesting user belongs. Such pages may have a look and feel associated with the third party service provider. The customization module may also determine a particular set of entitled applications and a set of business rules based upon the subentity code. In such an embodiment, the server system may provide user access only to the entitled set of applications. A user interface module may also be provided to generate the interactive pages according to the style indicated by the customization module. In at least one embodiment, the customization module may determine a common portion of the style based on the entity code, and may determine a subentity unique portion of the style based on the subentity code. The customization module may also modify the style in response to user unique page parameters based on a user identifier.

In at least one embodiment, a method for providing proxy Internet service to multiple entities on-line may include storing, using a database, at least one of a user identifier, an entity code, and one or more subentity codes. Each user identifier may be associated with at least one subentity code, and each subentity code may identify a constituency and be associated with one entity code. Each entity code in turn may be associated with a third party service provider. Such a method may also include selecting a set of applications to which the user is entitled based on subentity code, propagating the subentity code among the entitled applications, determining a set of business rules to be applied in conjunction with the entitled applications based on subentity code, determining a style for one or more interactive pages based upon the entity code and the subentity code associated with the constituency to which the requesting user belongs, the page style for a particular entity code having a common look and feel, generating the interactive pages associated with the entitled applications and in accordance with the determined set of business rules and the determined style such that the pages for a particular entity code have a common look and feel, and outputting the pages to a user at a terminal.

FIG. 1 illustrates at least one embodiment of a multi-entity portal system 100 in accordance with the present invention. A portal may be a web site that is a starting point for users when they are connected to the web, a site that users tend to visit as an anchor site, etc. Referring to FIG. 1, the multi-entity portal system 100 may include a server system 101 coupled to a network 103 that may communicate with one or more terminals 102. The server system 101 may also be coupled to a database server 106, which may in turn be coupled to one of or both of a multi-entity database 104 and an applications database 105. In at least one embodiment, server system 101 may be implemented using a single hardware and software computing platform, e.g., a Sun workstation® available from Sun Microsystems of Palo Alto, Calif. In other embodiments, the server system 101 may be implemented across multiple such computing platforms. In particular, the server system 101 may be implemented using a server farm (e.g., multiple computing platforms configured to function cooperatively as a server system). In addition, in at least one embodiment, the database server 106 and the server system 101 may both be implemented using the same computing platform or platforms.

Figure 2:
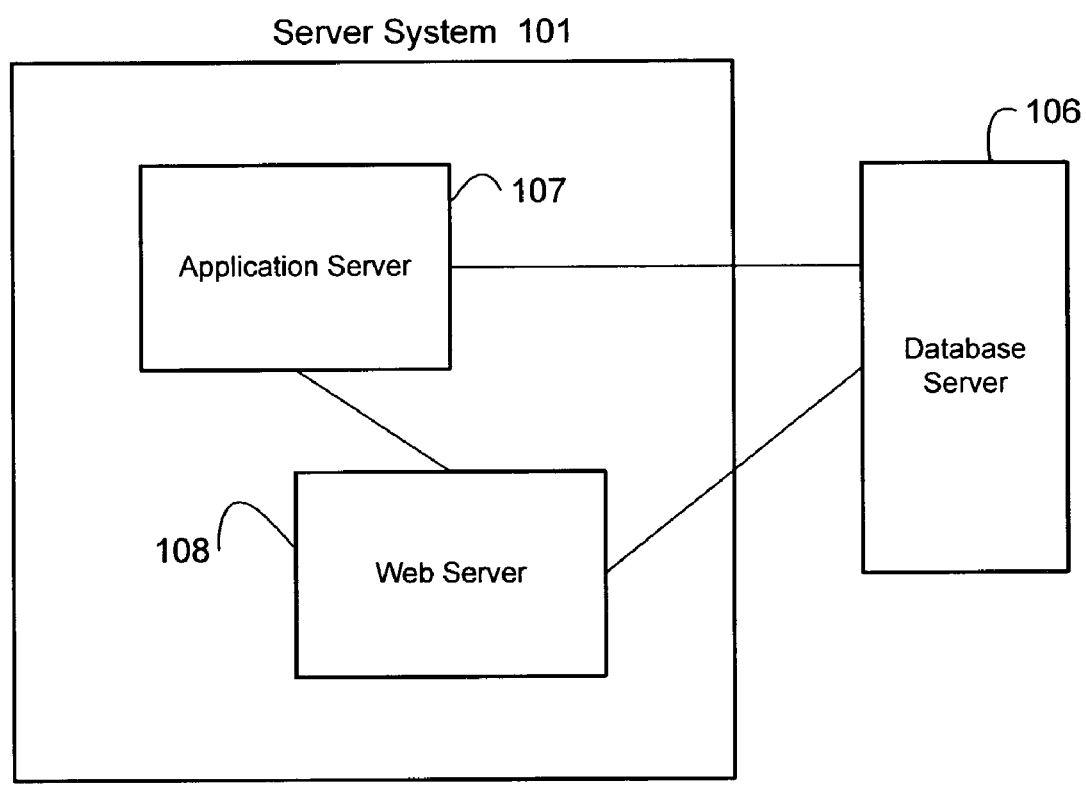
FIG. 2 illustrates an embodiment in which a server system includes an application server and a web server.

The server system 101 may, in certain embodiments, include one or more application servers, web servers, and database servers. For example, FIG. 2 illustrates an embodiment in which the server system 101 includes an application server 107 and a web server 108. The application server 107 and the web server 108 may communicate with each other and with the database server 106 using a network such as, but not limited to, a Local Area Network (LAN) such as an Ethernet. The application server(s) 107 may execute a server portion of software applications associated with the multi-entity portal system 100 and make available for download and communicate with a client portion of the applications. The web server 108 may interact with the application server 107 and the database server 106 for responding to commands and requests received via a network. For example, the web server 108 may build or construct interactive pages for output to a requesting user at a terminal 102 using information obtained from the multi-entity database 104 or the applications database 105 via the database server 106 as well as derived or other information supplied by one or more applications executing at the application server 107. The web server 108 may otherwise handle information requests and commands received from a network. The web server 108 may also output alarms and informational notifications and inquiries to a user at a terminal 102.

The multi-entity database 104 may provide storage for constituency and entitlement information useful for associating users with a constituency group and for use in selecting applications to which users of a particular constituency group are entitled. This information may include, but is not limited to, records containing a user identifier, an entity code, and a subentity code. Thus, the multi-entity database 104 may contain information useful for determining access to applications at the server system 101 based on constituency group.

In at least one embodiment, the information stored in or maintained using the multi-entity database 104 may be provided in conformance with a database management system format such as, but not limited to, the Structured Query Language (SQL) format. In at least one embodiment, the multi-entity database 104 may be implemented in accordance with the DB2 database product standard available from IBM Corporation. The multi-entity application 300 described herein may be stored using the multi-entity database 104. In other embodiments, the multi-entity database 104 may be, for example, a SQL database provided by the Oracle® Corporation of Redwood Shores, Calif. In at least one embodiment, the multi-entity database 104 may be a SQL Server 7.0 database supporting the ActiveX Data Object (ADO) and Open Database Connectivity (ODBC) protocols provided by IBM® Corporation or Sybase® Corporation. The multi-entity database 104 may further include information such as, but not limited to, database query and access instructions in the form of one or more scripts which, when executed by a processor, serve to store and retrieve data maintained using the multi-entity database 104 according to the instructions contained in the script, and in particular regarding the data fields to be accessed, as well as their arrangement, provided in the response to the processor.

The applications database 105 may provide storage for multiple applications accessible by the server system 101. The applications database 105 may include one or more sets of business rules associated with a constituency using, for example, a subentity code. In at least one embodiment, the server system 101 may download a client portion of a selected application to the terminal 102 of a requesting user for execution at the terminal 102. The server system 101 may first determine whether or not the requesting user is entitled to access the requested application based upon the user's identification information and associated constituency group as specified by information contained in, for example, the multi-entity database 104. In at least one embodiment, the server system 101 may identify a set of entitled applications that may be accessed by a group of users associated with a particular constituency using, for example, the subentity code. The server system 101 may execute a server portion of an application that has been provided to an entitled user at a terminal 102.

In at least one embodiment, the multi-entity database 104 and the applications database 105 may be operably coupled to the server system 101 using a database server 106. In these embodiments, the database server 106 may execute one or more sequences of database access instructions provided in the form of scripting instructions. As discussed herein, such scripts may in some embodiments conform to the SQL format. The database server 106 may be coupled to the server system 101 using a LAN, Wide Area Network (WAN), extranet, or other electronic, optical or wireless communications network.

The terminal 102 may be a personal computing device having a browser, such as a web browser application. Alternatively, the terminal 102 may be a wireless terminal such as a personal digital assistant, a cellular or portable telephone terminal, or an Internet appliance, configured for electronic or optical communication with the server system 101. An Internet appliance may be a computer with minimal memory, disk storage and processing power designed to connect to a network, especially the Internet. Although FIG. 1 shows three terminals 102, it is to be understood that the multi-entity portal system 100 may support any number of such terminals 102, including as few as one terminal 102. The terminals 102 may be collocated with the server system 101, or located remotely from the server system 101 and coupled to the server system 101 using the network 103, as shown in FIG. 1.

Figure 3:
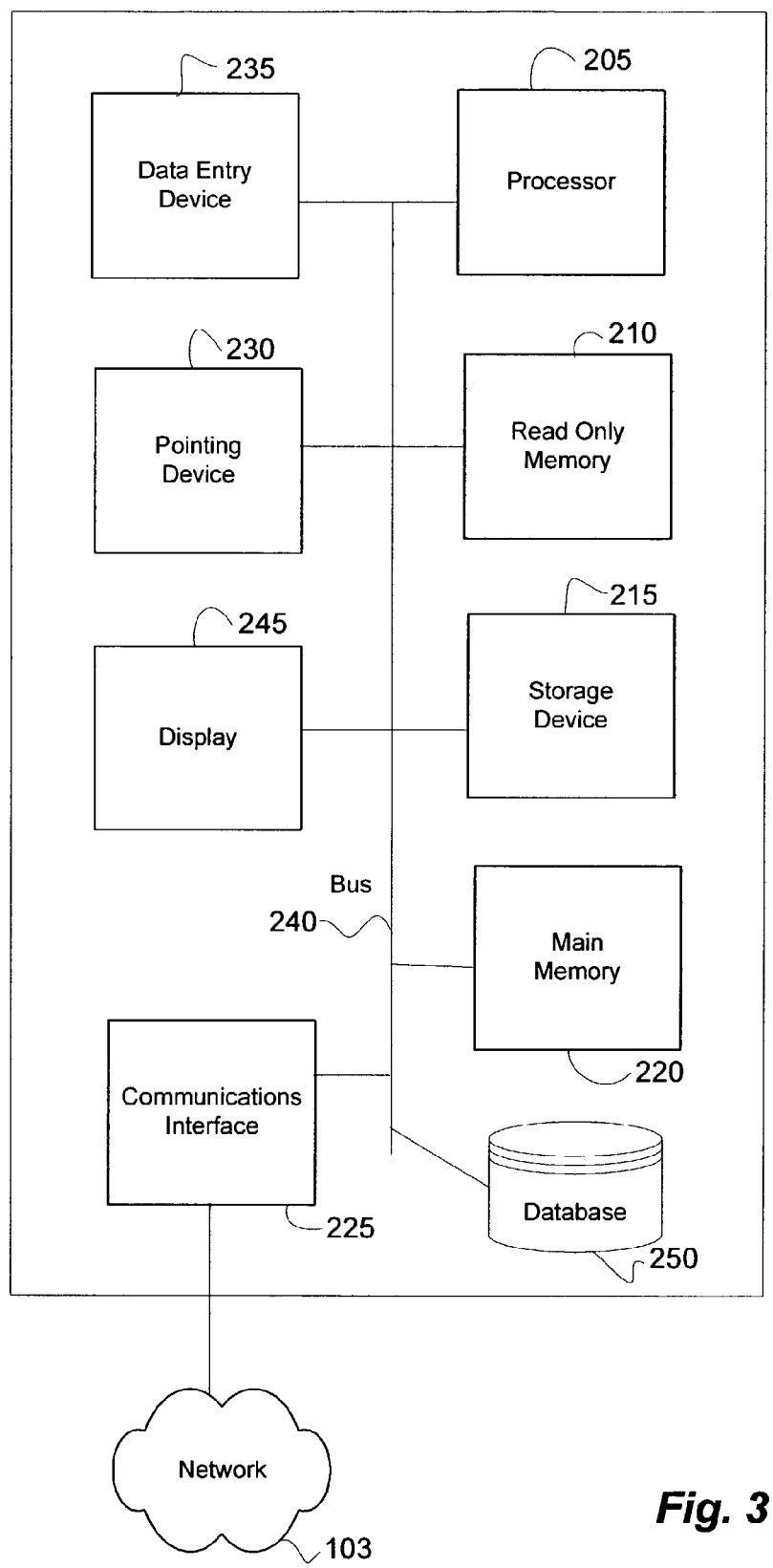
FIG. 3 is a block diagram of a computer system that may be used in at least one embodiment to implement the computing platform for the server system and the database server.

At least one embodiment of the present invention relate to the use of the computer system 200 for serving one or more applications selected from an entitled set of applications to a constituency group of users. FIG. 3 is a block diagram of a computer system 200 that may be used in some embodiments to implement the computing platform for the server system 101 and the database server 106. The computer system 200 may include a bus 240 or other communication mechanism for communicating information, and a processor 205 coupled with the bus 240 for processing information. The computer system 200 also may include a main memory 220, such as a Random Access Memory (RAM) or other dynamic storage device, coupled to the bus 240 for storing information and instructions to be executed by the processor 205. The main memory 220 also may be used for storing temporary variable or other intermediate information during execution of instructions to be executed by the processor 205. The computer system 200 further may include a Read Only Memory (ROM) 210 or other static storage device coupled to the bus 240 for storing static information and instructions for the processor 205. A storage device 215, such as a magnetic disk or optical disk, may be provided and coupled to the bus 240 for storing information and instructions.

In at least one embodiment, a database 250 may be coupled to the bus 240 for storing static information and software instructions. Information stored in or maintained using the database 250 may be provided in conformance with a database management system format such as, but not limited to, the SQL format. The database 250 may be a SQL database provided by the Oracle® Corporation of Redwood Shores, Calif. Alternatively, the database 250 may be a SQL Server 7.0 database supporting the ADO and ODBC protocols provided by IBM® Corporation or Sybase® Corporation. The database 250 may include information including, but not limited to, database query and access instructions in the form of one or more scripts which, when executed by a processor such as the processor 205, serve to store and retrieve data maintained using the database 250 according to the instructions contained in the script, and in particular regarding the data fields to be accessed, as well as their arrangement, provided in the response to the processor 205.

According to at least one embodiment of the present invention, provision of on-line services to multiple entities in the manner described earlier herein may be provided by the computer system 200 in response to the processor 205 executing one or more sequences of instructions contained in the main memory 220. Such instructions may be read into the main memory 220 from another computer-readable medium, such as the storage device 215 or the database 250. Execution of the sequences of instructions contained in the main memory 220 may cause the processor 205 to perform the process steps described herein. One or more processors in a multi-processing arrangement may also be employed to execute the sequences of instructions contained in the main memory 220. Alternatively, hard-wired circuitry may be used in place of or in combination with software instructions to implement the invention. Thus, embodiments of the invention are not limited to any specific combination of hardware circuitry and software.

The computer system 200 may be coupled via the bus 240 to a display 245 for outputting information to a computer user. In one embodiment, the display 245 may be a cathode ray tube (CRT) computer display monitor capable of displaying information using multiple colors. Alternatively, the display 245 may be a liquid crystal display, a monochrome monitor, a web-enabled wireless terminal or handheld terminal such as, for example, a Personal Digital Assistant (PDA). The computer system 200 may include other output devices as well such as, but not limited to, a printer.

A data entry device 235, including alphanumeric and other keys, may be coupled to the bus 240 for communicating information and command selections to the processor 205. Another type of user input device which may be coupled to the bus 240 is a pointing device 230, which may be a computer mouse, trackball, cursor direction keypad, tactile directional fingerpad, or other such device for allowing a user to control cursor location and movement on the display 245, and for communicating direction information and command selections to the processor 205. This pointing device 230 typically has two degrees of freedom in two axes, a first axis (e.g., x) and a second axis (e.g., y), that allows the pointing device to specify positions in a plane.

The term "computer-readable medium" as used herein refers to any medium that participates in providing instructions to the processor 205 for execution. Such a medium may take many forms, including, but not limited to, non-volatile media, volatile media, and transmission media. Non-volatile media include, for example, optical or magnetic disks, such as the storage device 215. Volatile media include dynamic memory, such as the main memory 220. Transmission media can also take the form of acoustic or light waves, such as those generated during Radio Frequency (RF) and Infrared (IR) communications. Common forms of computer-readable media include, for example, floppy disk, a flexible disk, hard disk, magnetic tape, any other magnetic medium, a Compact Disc Read Only Memory (CD, ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, a carrier wave as described hereinafter, or any other medium from which a computer can read.

Various forms of computer-readable media may be involved in carrying one or more sequences of one or more instructions to the processor 205 for execution. For example, the instructions may initially be borne on a magnetic disk of a remote computer. The remote computer may load the instruction into its dynamic memory and send the instructions over a telephone line using a modem. A modem local to the computer system 200 may receive the data on the telephone line and use an infrared transmitter to convert the data to an infrared signal and place the data on the bus 240. The bus 240 may carry the data to the main memory 220, from which the processor 205 retrieves and executes the instructions. The instructions received by the main memory 220 may optionally be stored on the storage device 215 either before or after execution by the processor 205.

The computer system 200 may also include a communication interface 225 coupled to the bus 240. The communication interface 225 may provide a two-way data communication coupling to a network 260. For example, the communication interface 225 may be a modem or an Integrated Services Digital Network (ISDN) card to provide a data communication connection to a corresponding type of telephone line. As another example, the communication interface 225 may be a LAN card to provide a data communication connection to a compatible LAN. Wireless links may also be implemented. In any such implementation, the communication interface 225 sends and receives electrical, electromagnetic, or optical signals that carry digital data streams representing various types of information.

The communication interface 225 may provide data communication through one or more networks to other data devices. For example, the communication interface 225 may provide a connection through a local network to a host computer or to data equipment operated by an Internet Service Provider (ISP). The ISP may in turn provide data communication services through the worldwide packet data communication network, now commonly referred to as the "Internet." These networks use electrical, electromagnetic, or optical signals that carry digital data streams. These signals are exemplary forms of carrier waves transporting the information.

The communications interface 225 may include Ethernet interface or a LAN communication card, a dial-up modem interface using the Public Switched Telecommunication Network (PSTN), an intranet, or any combination thereof.

The computer system 200 may send messages and receive data, including program codes, through the network(s) and the communication interface 225. In the Internet example, a server might transmit a requested code for an application program through the Internet, ISP, and the communication interface 225. One such downloaded application may, for example, provide for time entry management as described herein. The received code may be executed by the processor 205 as it is received, and/or stored in the storage device 215, or other non-volatile storage for later execution. In this manner, the computer system 200 may obtain an application code in the form of a carrier wave.

The server system 101 may receive commands and data from the terminals 102 and output program code and data to the terminals 102 using the network 103. In an embodiment, the server system 101 may generate and transmit the requested information to the requesting user via Hypertext Transfer Markup Language (HTML) formatted or Extensible Markup Language (XML) formatted pages, which may be provided as World Wide Web pages, using the network 103. The network 103 may be, for example, a network of interconnected networks such as the Internet, a LAN, a WAN, an intranet including any of these, and/or the PSTN. Interactive pages transmitted and received using the network 103 may conform to the Secure Socket Layer (SSL) protocol.

The communications interface 225 may further include a web browser or a thin client 220. A thin client may be a client portion of an application designed to require little memory so that the bulk of the data processing occurs on a corresponding server. In at least one embodiment, a thin client may be Java-based. The web browser displays data and is capable of communicating with other computers via a network such as, for example, the Internet or an intranet. The web browser provides a user with a way to navigate, via, for example, hyperlinks which are selected by the pointing device 230 such as a computer mouse, or as typed in by the user. The web browser uses a protocol such as, for example, HyperText Transfer Protocol (HTTP) or File Transfer Protocol (FTP), to transmit data of various content such as, for example, HTML formatted documents, plain text documents, graphic images, and XML documents for presentation to the user via the display 245. Web pages formatted in accordance with HTML or XML may also be provided in accordance with the Extensible Style Language (XSL) specification available from the World Wide Web Consortium. XSL is useful for separating style from content as well as for providing a common interface for sharing of web pages across applications. The web browser may also run or execute programs, such as Java applets including sequences of instructions provided in accordance with the Java programming language, or JavaScript. The web browser may be, for example, Internet Explorer® by Microsoft® Corporation, Netscape Navigator® by Netscape®, America Online® browser, or any other web browser. A thin client may utilize a two or more tiered client server model. In this model, the may client run a minimal set of services that provide functionality to interface with at least one server. A web browser may be a thin client. Server system 101 may run, for example, the Windows® NT network operating system available from Microsoft Corporation or Redmond, Wash.

Instructions executed by the processor 205 from the main memory 220 may include, for example, application software instructions that cause the processor 205 to perform as described herein. These application instructions may be implemented in the form of source code statements provided in accordance with, for example, the Visual C++® and Visual Basic® higher order programming languages, development kits for which are available from Microsoft Corporation of Redmond, Wash. Other embodiments are possible. Application instructions may also include database scripts for accessing, storing, or selectively retrieving information contained in the database 250, the multi-entity database 104, or the applications database 106. The database scripts may be contained in the storage device 215 or may be stored using the database 250, the multi-entity database 104, or the applications database 106. The database scripts may be implemented in the form of programming statements provided in accordance with, for example, SQL version 7.0 database management system query language, as well as the IBM DB2® system. Other database implementations are possible, including those available from Oracle® or Transact SQL in accordance with the ColdFusion® database management system.

Application software instructions may include a user interface portion, which may be a graphical user interface (GUI) portion, for generating interactive pages or display screens by which a user may provide data to and receive information from the computer system 200 and the database 250 or the applications database 106 using a human-machine interface such as, but not limited to, the display 245. Interactive pages may include user dialog boxes for accepting user entered information. The human-machine interface may also include a hardcopy generating device such as a printer. A user may interact with the computer system 200 via the graphical user interface provided by the GUI portion by using the pointing device 230 and the data entry device 235. The GUI portion may place the output of the computer system 200 in a format for presentation to a user via the display 245.

In particular, a user may select a particular data entry field of an interactive display page presented using the display 245 by using the pointing device 230 or the data entry device 235 to select that field. Upon selecting a field, a user may then enter information into the data entry field using the data entry device 235. After the user has entered data into the data entry field, the user may cause the GUI portion to input the user-entered information to the computer system 200 using the pointing device 230 to select a corresponding display icon or command button.

The server system 101 may include programmed instructions for execution which cause the server system 101 to perform the method or methods according to the exemplary embodiments as described herein. The server system 101 may further include an application program that includes one or more executable code segments operable to configure the server system 101, terminal 102, or database server 106 to perform operations as described herein. In particular, FIG. 1 illustrates a multi-entity application 300 that may include code segments such as an authentication module 301, a customization module 302, and a user interface module 303. These application modules may be stored in the main memory 220 or the storage device 215 of the computer system 200. Portions of code and data associated with these application modules may also be maintained using the database 250, the multi-entity database 104, or the applications database 106. In at least one embodiment, Java servlets, Java Server Pages (JSP) (or, alternatively, Active Server Pages (ASPs)), and a default application set service may run on an application server portion of the server system 101 such as the application server 107 of FIG. 2. In such embodiments, the application server may be provided in conformance with the WebSphere™ 3.5 application server available from IBM Corporation. The multi-entity portal system 100 may be implemented using an existing server system 101 platform in conjunction with other services provided by that platform, to allow Internet access to clients of additional business units.

Java Server Pages are a server side technology that are an extension to the Java servlet technology provided by Sun Microsystems, Inc. JSPs may have a dynamic scripting capability that works in tandem with HTML or XML formatted code that operates to separate page logic from static page elements. Java source code embodying the JSPs may be embedded in the HTML or XML page. JSPs may also be used to perform dynamic database queries. JSPs are not restricted to any specific platform or server.

A client portion the multi-entity application 300 (which may include client portions of each of these modules 301, 302, or 303) may be downloaded by the server system 101 to the terminal 102 via the network 103 in response to a user at a terminal 102 requesting to access the multi-entity portal system 100. In particular, in response to a user request, the terminal 102 may transmit one or more messages requesting an interactive page from the multi-entity portal system 100 to be provided to the terminal 102. The terminal 102 may receive the user request, via data entry device, upon user selection of an associated hyperlink or upon a user entering a Uniform Resource Locator (URL) address associated with the server system hosting the multi-entity portal system 100. The terminal 102 may transmit the message requesting access to the server system 101 as an HTML or XML formatted message in accordance with the HTTP protocol.

Figure 4:
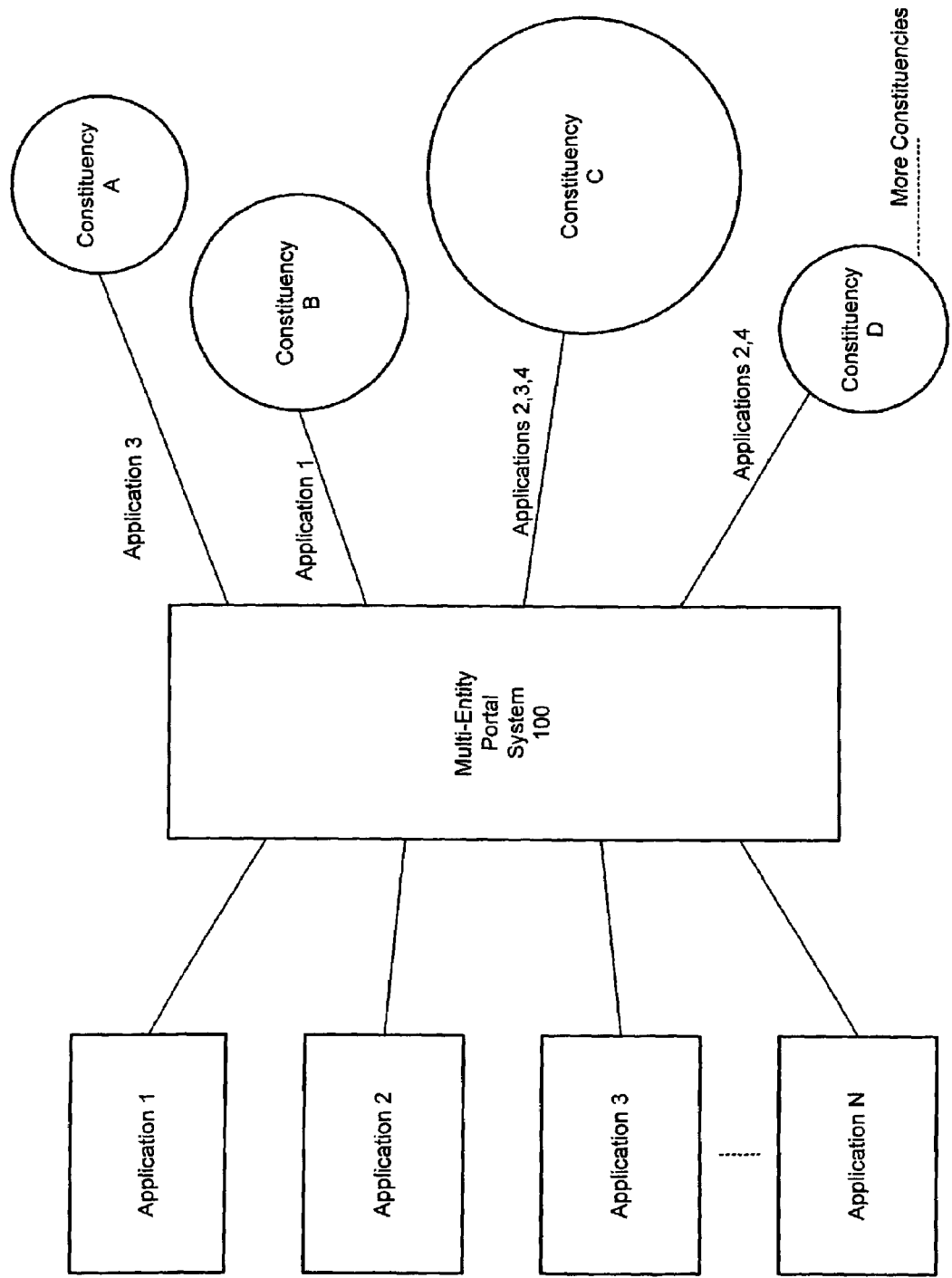
FIG. 4 illustrates the relationship by which at least one embodiment may determine a set of applications that can be accessed by a constituency of users from among the applications associated with a server system based on an identifier such as a subentity code.

The multi-entity portal system 100 may, for example, determine a set of applications that can be accessed by a constituency of users from among the applications associated with a server system based on an identifier such as, but not limited to, a subentity code. This relationship is illustrated in FIG. 4, in which the multi-entity portal system 100 allows access to Application 3 by, Constituency group A users. Similarly, the multi-entity portal system 100 allows access to Application 2, 3, and 4 by Constituency group C users, and so on. There is no theoretical limit on the either the number of applications or constituencies supported by the multi-entity portal system 100.

Figure 5:
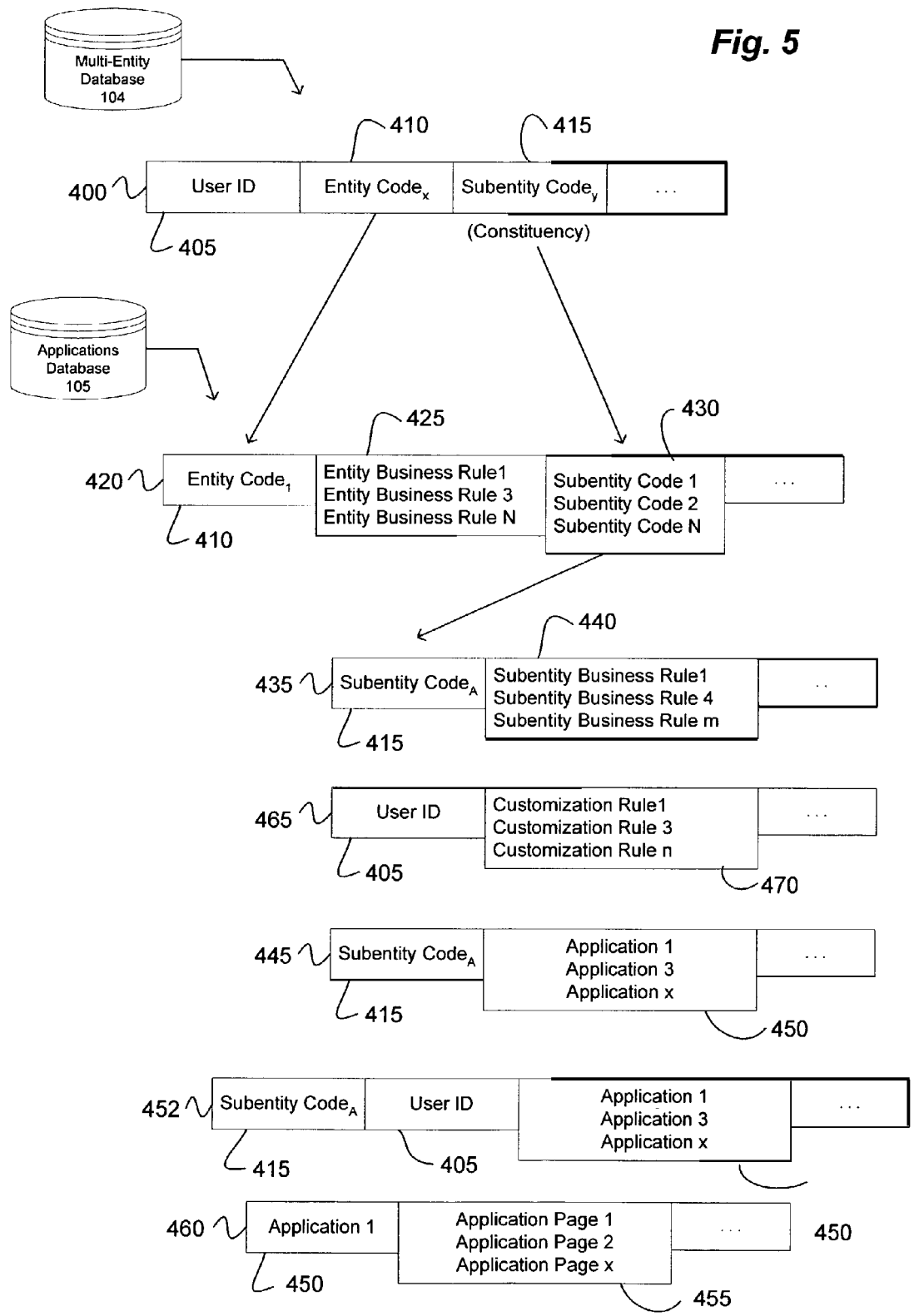
FIG. 5 shows an exemplary construction and arrangement for a multi-entity database and applications database in at least one embodiment.

In at least one embodiment, the multi-entity database 104 and applications database 106 may be structured and arranged according to the database schema shown in FIG. 5. Referring to FIG. 5, the multi-entity database 104 may include one or more user constituency records 400. Each user constituency record 400 may include a user ID 405, an entity code 410, and a subentity code 415. The subentity code 415 may associate a user ID 405 with a constituency group identified by the subentity code 415. Each of the entity records 420 may further include information useful for identifying a set 430 of Subentity Codes 415 associated with a particular Entity Code 410. For example, FIG. 5 shows an exemplary Subentity $Code_1$, Subentity $Code_2$, and Subentity $Code_N$ being associated with Entity $Code_1$. Each Subentity Code 415 may be associated with one Entity Code 410 using one or more entity records 420 maintained by the multi-entity database 104.

The applications database 105 may include one or more entity records 420, subentity records 435, user customization records 465, applications records 445, and applications pages records 460. Each subentity record 435 may include a set of Subentity Business Rules 440 associated with a particular Subentity Code 415. For example, FIG. 5 shows exemplary Subentity Business Rules 1 through "m" being associated with Subentity $Code_A$. Each Subentity Business Rule 440 may be associated with at least one Subentity Code 415 using one or more subentity records 435 maintained by the applications database 106. In at least one embodiment, each Subentity Business Rule 440 may specify elements of a particular page format such as, but not limited to, colors, interactive links, and look and feel, unique to application pages accessible to users associated with the Subentity Code(s) 415 with which the Subentity Business Rule 440 is associated.

Each user customization record 465 may include a set of Customization Rules 470 associated with a particular User ID 405. For example, FIG. 5 shows exemplary Customization Rules 1 through "N" being associated with a particular User ID 405. Each Customization Rule 470 may be associated with at least one User ID 405 using one or more user customization records 465 maintained by the applications database 106. In at least one embodiment, each Customization Rule 440 may specify elements of a particular page format to reflect a set of stored user preferences such as, but not limited to, default pages and default interactive links, and data fields uniquely identified as preferences for the associated User ID 405.

Furthermore, the applications database 105 may further include one or more entity business rules records 420. Each of the entity records 420 may include information useful for identifying a set of Entity Business Rules 425 associated with a particular Entity Code 410. For example, FIG. 5 shows an exemplary Entity Business $Rule_1$, Entity Business $Rule_3$, and Entity Business $Rule_N$ being associated with Entity $Code_1$. Each Entity Business Rule 425 may be associated with at least one Entity Code 410 using one or more entity records 420 maintained by the applications database 105. In at least one embodiment, each Entity Business Rule 425 may specify a particular page format such as, but not limited to, colors, interactive links, and look and feel, common to all application pages accessible to users associated with the Entity Code(s) 410 with which the Entity Business Rule 425 is associated.

In at least one embodiment, the page construction information provided in association with the Subentity Codes 415 and user ID 405 supplement and modify portions of the page construction information provided in association with the relevant Entity Code 410; that is, the Subentity Business Rules 440 and Customization Rules 470 serve to further define and modify the page construction information specified by the Entity Business Rules 425. Using the thus-identified Entity Business Rules 425, Subentity Business Rules 440, and Customization Rules 470 associated with a user (through-the relationship specified using the Entity Codes 410, Subentity Codes 415, and User ID 405) the multi-entity portal system 100 produces application pages, accessible by the associated user, having a common look and feel as well as a degree of commonality of function, among all application pages accessible by users belonging to a particular constituency (i.e., Subentity Code 415). Further, the common elements of the application page construction information are maintained across all application pages accessible by users associated with a particular Entity Code 410, except where modified by the page construction information specified by the Subentity Business Rules 440 and Customization Rules 470. In this way, embodiments of the multi-entity portal system 100 are able to provide access to multiple applications (and the page information associated with them) while preserving the common appearance and interactive usage features within a constituency, and while also preserving the common appearance and interactive usage features to the extent possible across applications and their interactive pages associated with the larger group of users associated with an Entity Code 410.

For example, "Service Provider X" may be identified by Entity Code$_{55}$. "Service Provider X" may have one or more distinct services that it provides to its clients. Each of these services may be associated with a different business unit of "Service Provider X." A service provider may be a third party with respect to the entity hosting the system. In at least one embodiment, each service of "Service Provider X" will be identified using a different Subentity Code 415. The interactive pages accessible to constituent users of each service may share a common look and feel for the applications associated with that service. Further, the interactive pages accessible to the users of different constituencies across the different services provided by "Service Provider X" will share certain appearance and usage features that serve to commonly identify the service with "Service Provider X." In this way, embodiments of the multi-entity portal system 100 promote the strength of the branding and other product/service identification information associated with "Service Provider X" across its different service offerings. This has at least one advantage of preventing dilution of "Service Provider X's" surfacing branding information across various services. Furthermore, in this way the multi-entity system 100 may serve as a proxy service provider for "Service Provider X" to its constituency.

Figure 8:
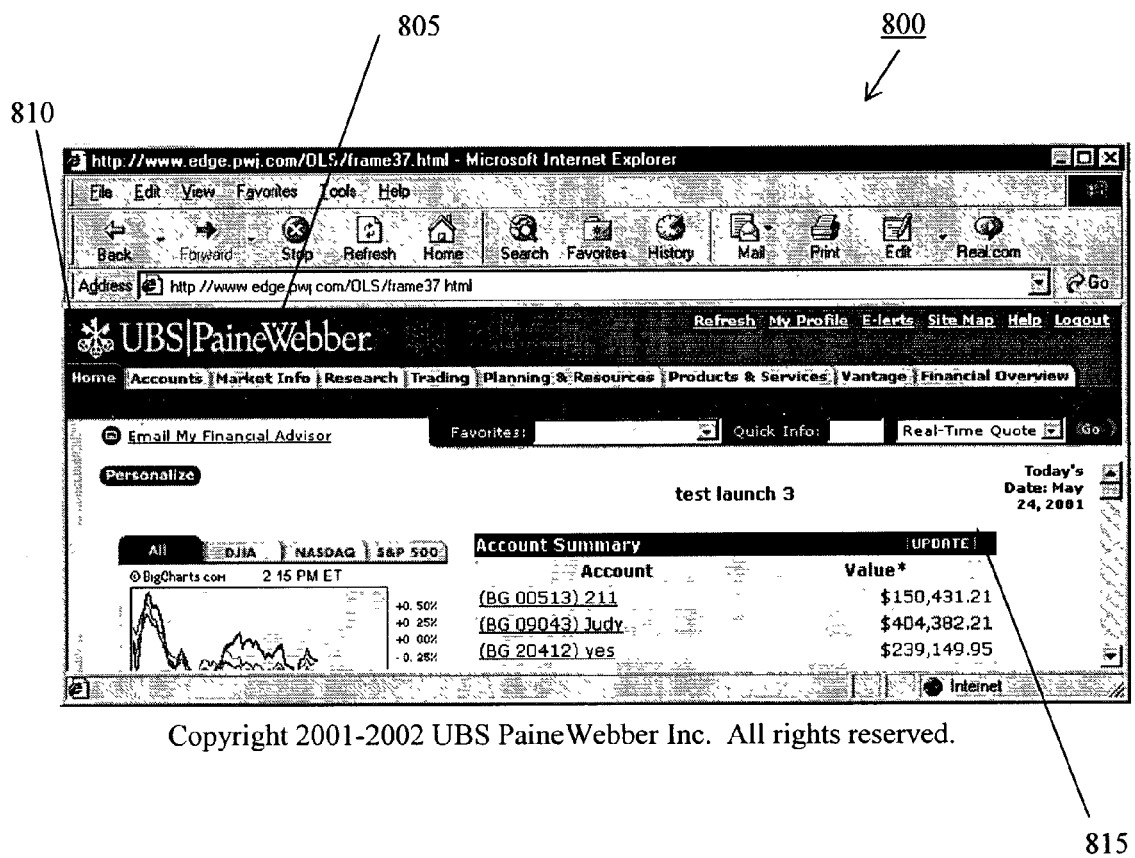
FIG. 8 is an exemplary interactive output page provided in accordance with at least one embodiment.

An example page provided in accordance with at least one embodiment is shown in FIG. 8. Referring to FIG. 8, a page 800 may include page formatting associated with an Entity Code 410, including an entity style 805. The entity style 805 may be useful for conveying a uniform look and feel to users accessing applications 450 that provide one or more services for the entity identified by the Entity Code 410. Formatting particular to a specific Subentity Code 415 (associated with the Entity Code 410) may include functions and interactive links in accordance with a subentity style 810. Furthermore, information may be grouped, arranged, or selected for display in accordance with user preferences 815 associated with particular entitled users accessing the corresponding application 450.

Referring again to FIG. 4, the multi-entity database 104 may include one or more user applications records 445 and application pages records 460. Each applications record 445 may associate a set of one or more applications 450 with a particular Subentity Code 415. The set of applications 450 may identify those applications accessible by a user associated with the Subentity Code 415. For example, FIG. 4 shows an exemplary Application$_1$, Application$_3$, and Application$_N$ being associated with Subentity Code$_7$. The multi-entity portal system 100 may use the information contained in the user applications records 445 to determine which applications to make accessible to a user. The application code and data and associated page information may be maintained using the applications database 106. Each application pages record 460 may identify those application pages 455 that the multi-entity portal system 100 may provide to a user associated with the Application 450. For example, FIG. 4 shows an exemplary Application Page$_1$, Application Page$_2$, through Application Page$_N$ being associated with Application$_1$.

The above described information contained in the user constituency records 400, entity records 420, subentity records 435, applications records 445, and applications pages records 460 may be modified or updated as required. An administrative user may interact with the customization module 302 to make additions, changes, or deletions to the information contained in the multi-entity database 104. The customization module 302 may communicate with the database server 106 to accomplish this update. The multi-entity portal system 100 thereby provides for customization of the interactive page information accessible by a group of users for the set of entitled applications at both the page and application levels.

The multi-entity portal system 100 may provide the set of accessible applications 450 to an application server or other computing platform for execution, including generation and output of interactive pages associated with the entitled applications. In particular, embodiments of the multi-entity portal system 100 may output certain multi-entity database 104 information to the executing platform or system such as, but not limited to, the Subentity Code 415, set of entitled applications 450, set of associated application pages 455, Entity Business Rules 425, and Subentity Business Rules 440. The system that executes the entitled application(s) may use this information in rendering the interactive pages to the constituent users. In at least one embodiment, each application 450 within the set of entitled applications 450 may have an associated interactive link, such as a hyperlink, provided on at least one interactive page provided to a requesting user for the purpose of receiving a user request to execute and provide pages in conjunction with a particular application 450.

Figure 7:
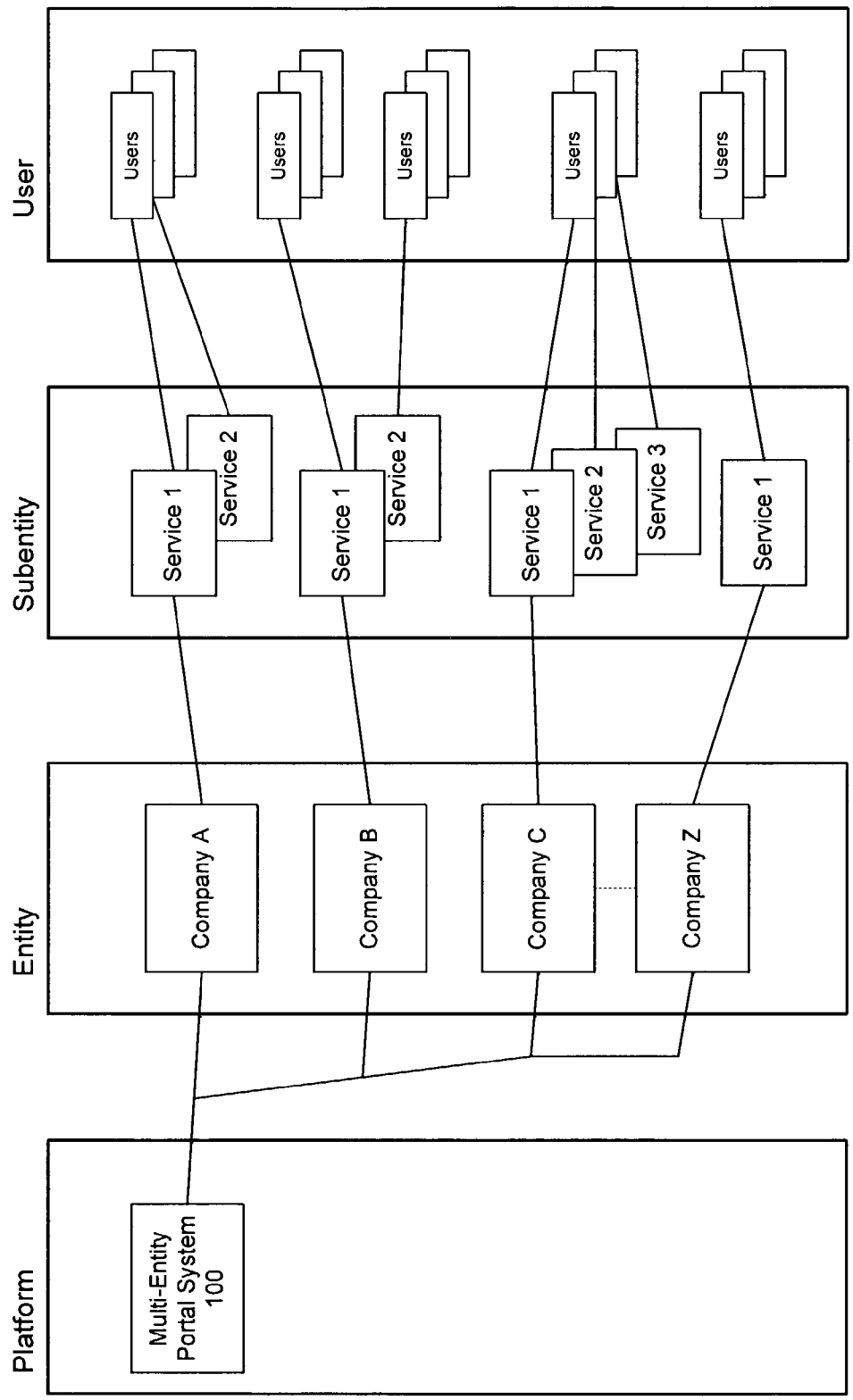
FIG. 7 illustrates a relationship between entities, subentities, and users in accordance with at least one embodiment.

In accordance with at least one embodiment, the multi-entity portal system 100 may utilize the customization approach thus described to provide custom branding of interactive pages for a third-party service provider. Such a third-party service provider may include "correspondence" firms. For example, a correspondence firm may enter into an arrangement wherein "Service Provider—X" provides its branding, look and feel, and other appearance features for interactive pages associated with applications of the "correspondence" firm. This may be desirable to increase the market acceptance of the correspondence firm's services within a group of target users by associating those services with a better known corporation such as "Service Provider X," for example. In this configuration, the multi-entity portal system 100 may function as a proxy service provider for the correspondence firm. The relationship between entities, sub-entities, and users is shown in FIG. 7.

Figure 6:
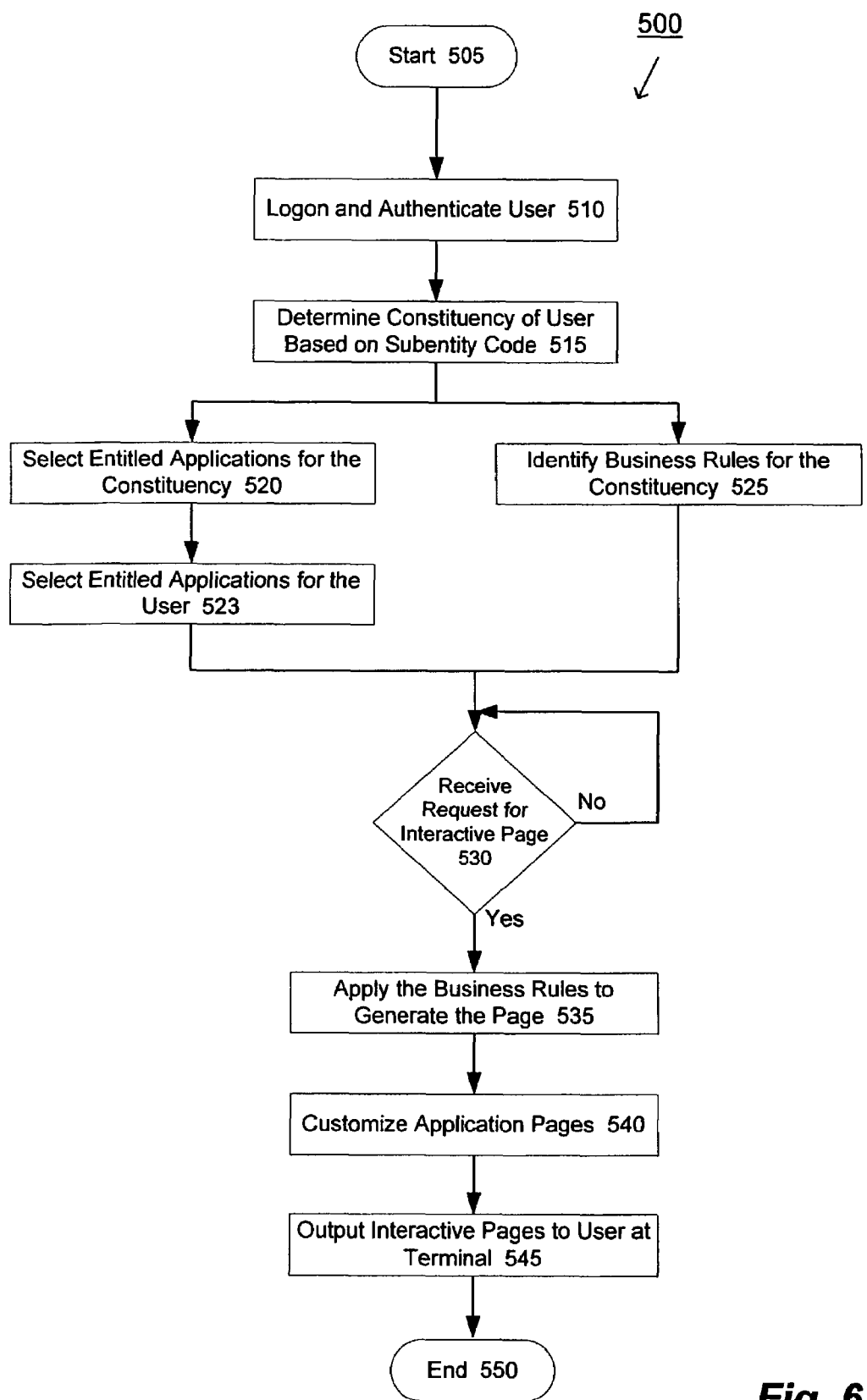
FIG. 6 is a flow chart of a method according to at least one embodiment of a multi-entity portal system.

A method 500 according to at least one exemplary embodiment is illustrated by the flow chart of FIG. 6.

Referring to FIG. 6, processing may begin at 505. In response to a user login request, a terminal 102 may transmit a message requesting an initial interactive page for accessing the multi-entity portal system 100, or login, to be provided to the terminal 102 at 510. In at least one embodiment, the authentication module 301 may communicate with an authentication application to perform portions of the login and authentication process. An example of such an authentication application is the Reality Online® product available from Reuters, Ltd. of London, England. Further details concerning Reality Online® are available from, for example, the World Wide Web at "realityonline.com" and "realityonline.com/sessionid.htm." The authentication application may run on a proxy server with which the server system 101 communicates for the purpose of authenticating a user requesting access. To accomplish login and authentication as described herein, in at least one embodiment, the authentication application (e.g., Reality Online®) may pass to the authentication module 301 certain parameters including, but not limited to, a UserRegID parameter and a HashedUserRegID based on the User ID 405 provided by the requesting user. Upon successful authentication by the authentication application of the User ID 405, the User-RegID may be passed to the authentication module 301 (along with the HashedUserRegID and other identifying items) from which the subentity code 415 may be determined via a lookup in the multi-entity database 104. These parameters, as a minimum, may also be passed from the authentication module 301 to the customization module 302 and a Navigation servlet portion of the user interface module 303. The UserRegID and HashedUserRegID may form the UserID and HashedUserID parameters as described elsewhere herein.

In response, the server system 101 may transmit the client portion of the authentication module 301 to the requesting terminal 102 in accordance with, for example, the HTTP protocol, or FTP, for execution by the terminal 102. Upon receiving the authentication module 301 from the server system 101, the terminal 102 may execute the client portion of the authentication module 301 to initiate terminal 102 processing related to the multi-entity functionality described herein.

For example, in at least one embodiment, upon receiving a request to access the multi-entity portal system 100, the authentication module 301 at 510 may cause the server system 101 to generate and output an interactive page requesting the user to provide her user identification (e.g., User ID). The web server 101 may output this interactive page to the terminal 102 of the requesting user by transmitting an HTTP-formatted message, for example, to the terminal 102 for display to the requesting user. Upon receiving the interactive page at the terminal 102, the user may choose to enter her user identification information into a data entry field in an interactive page provided for this purpose by using, for example, the data entry device 235. The user may then request the terminal 102 to transmit the interactive page containing the user identification information by, for example, selecting a corresponding button of the interactive page provided for this purpose, to the server system 101 for authentication. In addition to user identification information, the user may in some embodiments also be required to enter a password.

Upon receiving the requesting user's identification information at the server system 101, the authentication module 301 may determine whether or not the requesting user is entitled to access the requested application by interrogating the multi-entity database 104. As such, the authentication module 301 may provide security or firewall protection against unauthorized access to the multi-entity portal system 100. A firewall is a set of related programs located at a server that protects the resources of the network served by the server from users of other networks. The authentication module 301 may obtain the subentity code 415 from the multi-entity database 104 associated with the requesting user identifier based on, for example, the userID 405.

Referring again to FIG. 6, following login and authentication at 510 control may proceed to 515 at which the customization module 302 may determine the constituency of the user. In particular, the customization module 515 may execute a sequence of programmed instructions that cause the server system 101 to obtain or verify the Subcode Entity 415 associated with the User ID 405 of the requesting user. In at least one embodiment, the authentication module 301 may pass the received user identification information to the database server 106 with a request to determine the constituency to which the user belongs, at 515. The database server 106 may select and execute one or more scripts to locate and obtain this information from the multi-entity database 104 according to the database schema described above. The scripts may be stored using the multi-entity database 104, for example. Alternatively, user identification and authentication information is obtained from a database other than the multi-entity database 104, such as, for example, a legacy authentication database (not shown) to which the server system 101 is operably coupled. The customization module 302 may determine the constituency of the user based on the associated Subentity Code 415 thus obtained from the multi-entity database 104.

Control may then proceed to 520 to determine entitled applications for the requesting user. Based on the Entity Code 410 and Subentity Code 415 the customization module 302 may determine a set of applications 450 for a particular user group based on the requesting user's entitlements. In at least one embodiment, the Navigation Servlet portion of the user interface module 303 may obtain the default subset of applications 450 from a service that is constantly running on the server system 101. The custom subset associated with the subentity code and user preferences may be obtained by the Navigation Servlet from the multi-entity database 104.

The set of applications 450 that a user group is entitled to consist of two sub-sets. First, a subset is selected based on a default set of applications 450 associated with a particular Subentity Code 415. Every user associated with that Subentity Code 415 is entitled to access this initial default set of applications 450. The second subset is a custom set of applications 450 that a particular user group is entitled to access. In at least one embodiment, the default subset of applications 450 is generated by the "SP_DEFAULT" stored procedure portion of the customization module 302 based on the Subentity Code 415 passed parameter. This default subset may be static, and therefore may not need to be generated on every user login. Instead, a service may call the "SP_DEFAULT" stored procedure periodically (at a frequency of, for example, but not limited to, once every hour) and generate all possible default sets of the default application 450 set. This approach may act to minimize database access demands generated by the servlet. The thus-generated default subset may be used by the Navigation servlet to obtain a default subset for a particular subentity. In addition, the "SP_DEFAULT" stored procedure may return a set of default properties for a particular Subentity Code 415 such as, but not limited to, background image, style sheet, footer, language, and currency specifications for interactive pages provided in conjunction with the default applications 450.

If the multi-entity database 104 is inoperable or cannot be accessed to obtain the default application set, or if a default application set is not available to the Navigation servlet, then the Navigation servlet may generate the navigation bar to contain a pre-defined default set of applications.

Control may then proceed to 523 where, in at least one embodiment, the custom subset of applications 450 may be generated by a "SP_CUSTOM" stored procedure portion of the customization module 302 based on the client's UserID passed to it. The Navigation servlet may call this procedure on every client login after initial authentication at 510. The "SP_CUSTOM" procedure may return a subset of applications 450 to which the client has access in addition to the default set. The resulting customized set of entitled applications 450 may also contain user preferences, (e.g., currency or language) which will effect the look of pages output to the user in conjunction with the entitled applications 450.

Control may also proceed to 525, which may be performed prior to, concurrently with, or after 520 and 523, and at which the business rules associated with the constituency may be determined. The customization module 302 may determine the corresponding set of business rules by obtaining a set of Entity Business Rules 425 associated with the particular Entity Code 410 using multi-entity database 104. In at least one embodiment, the customization module 302 may provide the Entity Code 410 and Subentity Code 415 to the database server 106 with a request to determine the applicable Entity Business Rules 425 and the Subentity Business Rules 440. The database server 106 may select and execute one or more scripts to locate and obtain this information from the applications database 105 according to the database schema described above. The customization module 302 may determine the applicable business rules to apply in generating interactive pages for the entitled applications 450 to which the constituency has access.

Control may then proceed to 530 to await a user request for an interactive page associated with an entitled application 450. In at least one embodiment, the server system 101 may receive a user request for an interactive page from a terminal 102 as an HTML-formatted message transmitted in accordance with the HTTP protocol via the network 103.

Upon receiving a user request at 530, control may then proceed to 535 to generate the requested page and apply the business rules determined at 525. Based on the User ID 405 and Subentity Code 415, the user interface module 303 may identify the applications 450 accessible by that client and create a custom navigation frame. The user interface module 303 may provide a custom look for the entitled applications 450 based on Subentity Code 415 parameter passed by the authentication module 301. The look and feel of the pages for the entitled applications 450, as a minimum, may be dependent upon the subentity to which the client belongs. Based on the passed parameters (Subentity Business Rules 440) the Navigation servlet portion of the user interface module 303 may generate a custom navigation bar for the requested page. The contents of the navigation bar generated by the user interface module 303 may depend on the set of business rules selected at 525. The look and feel, as a minimum, of the navigation frame and the applications 450 may depend on Subentity Code 415 parameter. This parameter (Subentity Code 415) may be passed to every application 450 to identify style sheet and footer format information, as a minimum, to be used in conjunction with that application 450.

Control may then proceed to 540, at which the application page generated at 535 may be further customized according to a set of user specific parameters such as, but not limited to, user preferences maintained using the applications database 105. Alternatively, the user preferences and other user specific parameters may be maintained using an external database and provided to the user interface module 303 in the form of one or more passed parameters.

Control may then proceed to 545, at which the user interface module 303 may output the interactive page to the requesting user. In at least one embodiment, the user interface module 303 may transmit the rendered interactive page from the server system 101 to the terminal 102 of the requesting user as an HTML or XML formatted page in accordance with the HTTP protocol using the network 103. Upon receiving the interactive page, the client portion of the multi-entity application 300 at terminal 102 may output the page to the user using, for example, the display of the terminal 102. FIG. 8 illustrates an exemplary interactive page provided by at least one embodiment.

Figure 9:
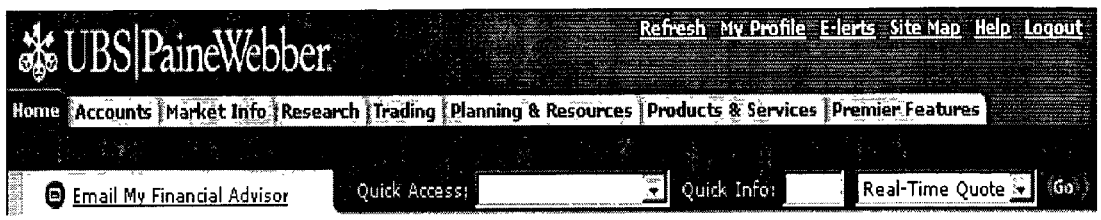
FIG. 9 illustrates additional exemplary interactive pages provided by at least one embodiment.
Figure 9:
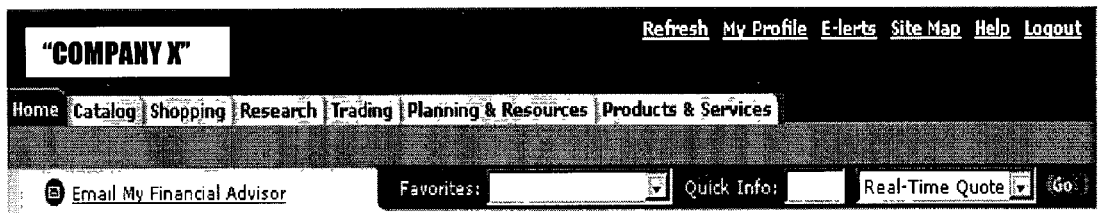
Figure 9:
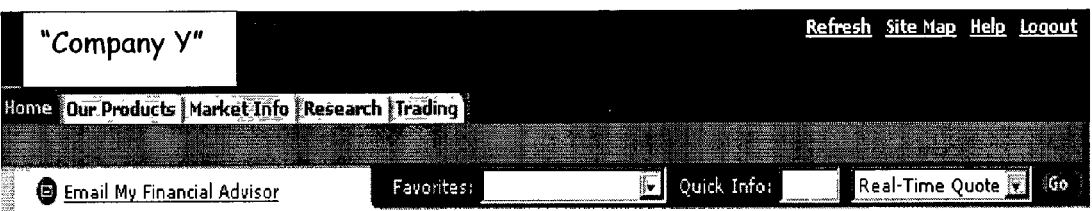

FIG. 9 illustrates additional exemplary interactive pages provided by at least one embodiment. Referring to FIG. 9, exemplary pages 900 may include page formatting associated with an Entity Code 410, including an entity style useful for conveying a uniform look and feel to users accessing applications 450 that provide one or more services for the entity identified by the Entity Code 410, as described earlier with respect to FIG. 8. Formatting particular to a specific Subentity Code 415 (associated with the Entity Code 410) may include functions and interactive links in accordance with a subentity style, and information may be grouped, arranged, or selected for display in accordance with user preferences associated with particular entitled users, as described earlier with respect to FIG. 8.

Control may then proceed to 550, at which the method 500 may end.

Further detail concerning the default subset service, "SP_DEFAULT," portion of the Navigation servlet portion of the customization module 302 will now be described. In at least one embodiment, this service may determine and store a default subset of applications 450 and page properties for each subentity. Related data may be maintained using the multi-entity database 104. SP_DEFAULT may be implemented, for example, using a sequence of Java code instructions. SP_DEFAULT may begin executing upon startup of the server system 101 (which may include the application server 107 portion) and continue running while the server system 101 continues to operate. In particular, the service may be implemented as a Java thread with several helper classes to allow constant access to the service from the Navigation servlet portion. The Navigation servlet may accomplish periodic update of the default set of applications 450 by periodically calling the SP_DEFAULT procedure. For example, the Navigation servlet may call the SP_DEFAULT procedure on an hourly basis. If the multi-entity database 104 is not available during the service startup, the Navigation servlet may generate and output an error page.

The SP_DEFAULT service may be built as a thread, which periodically calls a method of a "Storage" object (e.g., a "refresh()" method) to refresh default applications 450 data. The "Storage" object may serve as data storage for default sets of applications 450 and page properties. Data associated with the Storage object may be stored in "ServiceBeans," wherein every bean stores unique data that represents one subentity. The "ServiceBean" may be a Java bean that stores a default set of applications 450 and page properties for one subentity. The bean may include necessary methods and objects to manipulate that data. All the beans may be stored in a "HashMap" object that allows asynchronous access to read that data. Java beans are Java code objects that conform to the specification developed by Sun Microsystems™ that also defines how Java objects interact, similar to an ActiveX control.

Data retrieved from the multi-entity database 104 using the "refresh()" method by the SP_DEFAULT procedure may be stored in temporary storage at first (e.g., another Hash-Map), and then permanent storage of the default set of applications 450 will be updated to reflect the retrieved data by, for example, re-pointing a storage variable contained in the multi-entity database 104 to the retrieved object. During the process of re-assigning the permanent storage variable to the new location in memory, the data may be locked (i.e., not accessible to be read) by a "Locker" object. "Locker" may be a utility class that allows synchronous access to the data stored in the Storage object if necessary, e.g., when the data is being refreshed in the permanent storage. Using the Locker object allows the customization module 302 to minimize the period of locking the storage. The Storage object may contain methods to allow data retrieval for a specific subentity by passing the Subentity Code 415 in an "Access" object. "Access" may be an object class that will allow default data retrieval from the service for a particular subentity by Subentity Code 415 using, for example, a static method(s). If the service is trying to update the permanent storage, and the permanent storage contains data for that location but the multi-entity database 104 is unavailable, then the service may cause the permanent storage location to remain unchanged until the next stored procedure call.

The Navigation servlet portion of the user interface module 303 will now be described in further detail. In at least one embodiment, the Navigation servlet requires input of certain parameters in order to operate as described herein. In particular, the Navigation servlet may receive the Subentity Code 415, the User ID 405, and an encrypted version to the User ID. In at least one embodiment, the encrypted version of the User ID 405 is provided by a "HashedUserID" parameter. The Subentity Code 415 parameter allows identification of subentity default applications 450 and page properties. The User ID 405 and HashedUserID parameters may be used for further user authentication and obtaining of a customized application subset and user page preferences. The customized application subset and user page preferences may be used by the Navigation servlet to generate a custom navigation bar as described earlier with respect to FIG. 6.

The Navigation servlet may obtain the default data subset by calling the default subset service SP_DEFAULT described hereinabove, depending on the Subentity Code 415 parameter. The customized subset may be obtained by the Navigation servlet from the multi-entity database 104 by calling the SP_CUSTOM stored procedure based on the User ID 405 parameter. In at least one embodiment, SP_CUSTOM may be called if the default set was successfully retrieved from the SP_DEFAULT service. If the default subset of applications 450 is not available from the SP_DEFAULT service, SP_CUSTOM may not be called; in this case, an error page may be generated and output. If the default subset was obtained successfully, but the multi-entity database 104 or the applications database 105 is not available and/or custom data is not available, then the Navigation servlet may generate a default navigation bar. A user within a constituency may only see page tabs appropriate to their associated Entity Code 405 and Subentity Code 415.

The multi-entity application 300 may provide several common services relating to the multi-entity portal system 100. Each of the modules 301, 302, and 303 may perform a portion of the processing required to provide these functions individually or cooperatively. In particular, the multi-entity application 300 may allow the multi-entity portal system 100 to support multiple distinct entities and user communities (or, constituencies) from the same base platform system. Furthermore, the multi-entity application 300 may provide entity-specific (i.e., constituencies within the same Entity Code 410) services such as, but not limited to, page navigation, entitlements, page footer, and page look and feel. Furthermore, the multi-entity application 300 may provide application 450 entitlements for entities and their associated individual users, dynamic HTML or XML page style sheet and logo images, dynamic HTML or XML page footer and legal disclaimers, application API for entity name and display rules, and support for multiple URL entry points.

The user interface module 303 may provide for update of certain information output to a user constituency associated with a Subentity Code 415. In particular, in at least one embodiment individual users may update certain page parameters such as language preference. The updated parameter information may be transmitted by the client portion of the user interface module 303 at the terminal 102 to the server system 101 for updated storage using the multi-entity database 104. Furthermore, the multi-entity portal system 100 may provide an administrative user access level. Such administrative users may be granted permission to add, modify, or delete certain page parameters such as, but not limited to, entity and subentity profile information. Administrative users may also enroll new users and enter their entity default application 450 information. Administrative users may also entitle constituencies to additional or newly-available applications 450 to which the constituency group has access as specified by the associated Entity Code 410 and Subentity Code 415.

A methodology for creating applications 450 to operate in conjunction with the multi-entity portal system 100 will now be described. Each application 450 may be assigned its own subdirectory location (e.g. "/billPay/ . . . ") under a root directory associated with server system 101 using the applications database 106. All files for an application 450 may be maintained with its given subdirectory.

In at least one embodiment, applications 450 may be launched (i.e., commence execution) using the HTTP "Get" or "Post" method with the following parameters passed: UserID HashedUserID, appName, symb, navbar, AcctNum, Month, ClientSegment, USAID, TabName, E, SE, LC, CC, and UF. A sample URL containing these parameters may be:

"http://"multientity service".com/OLS/servlet/Account-Summary? UserID=XXX&HashedUserID= YYY&symb=&navbar=delayed&RTQ=& AcctNum=&Month=&appName=ClientSegment= GEN%2CBLY%2CRTQ&PWSUSAID=& TabName=AccSumm&E=& SE=&LC=&CC=&UF"

Upon launch, an application 450 may validate the UserID by, for example calling a validation procedure. If the validation is successful, the application 450 may proceed to generate page content. Otherwise, the application 450 may redirect the browser to an "Authentication Failure" page. A Java code implementation, add the following to validate the UserID and the HashedUserID:

```
String idParam = request.getParameter("UserID");
String hashCode = request.getParameter("HashedUserID");
if (idParam==null || hashCode==null || idParam.equals("")
    || hashCode.equals("")
    || !"Java class".compare(idParam, hashCode))
{
    sendRedirect("/OLS/Authfail.htm");
}
```

Table 1 describes the parameters involved in the application launch process discussed above.

TABLE 1

Explanation of Passed Parameters

| Parameter | Description |
|---|---|
| UserID | The unique ID (User ID 405) given to each multi-entity portal system user. |
| HashedUserID | The encrypted version of the UserID. Each UserID has one corresponding HashedUserID. |
| ClientSegment | States which portion, or "segment," of the applications 450 the user constituency is entitled to view, separated by commas. |
| symb | Represents a stock symbol. Used for applications involving market data. |
| appName | Application name. Used by OLS Platform applications only. |
| navbar | Used for applications involving live market information feeds. The parameter can take the values realtime or delayed. If the user is accessing real time information, the value will be realtime. |
| AcctNum | When accessing account information, this parameter is the account number. |
| Month | Month for which user wants to see the report. |
| USAID | A unique broker USA_ID. This ID allows the multi-entity portal system 100 to appropriately restrict brokers' access to client information. |
| TabName | The name of the $2^{nd}$-tier navigation item under which the current application is categorized. |
| E | "Entity Code 410." A code representing a particular business unit. (e.g. Correspondent Services, Retail, etc). |
| S | "Subentity Code 415." A code representing a particular company or outside entity. Each business unit can have multiple subentities. |
| UF | "User Flag." A placeholder for future changes. |
| LC | "Language Code." Represents the language of the particular subentity. If omitted, English may be used. |
| CC | "Currency Code." Represents the currency of the particular subentity. For instance, if the subentity is an Italian company, the currency code would represent Lire. If omitted, U.S. currency may be used. |
| Cntry | "Country Code." Represents the country location of the particular subentity. |

Applications 450 may contain many file-types, from HTML to Java. For an application to work in conjunction with the multi-entity portal system 100, the application's HTML or XML files should conform to certain programming standards. These standards may be designed to provide a common look and feel among different applications 450. HTML or XML (or JSP, ASP, etc.) pages in all applications 450 may conform to the following standards.

First, each HTML or XML file may include a JavaScript file that establishes access to the code and data libraries provided by the multi-entity application 300 for use by applications 450 in conjunction with the multi-entity portal system 100. Furthermore, the HTML or XML files may call procedures to load the applicable page style sheet information and to place the appropriate footer on associated pages. For example, a JavaScript file "ols.js" may be included in an HTML or XML file by provided the following JavaScript statement in the "<HEAD>. . . <HEAD>" section of the file:

<SCRIPT LANGUAGE='JavaScript' SRC='/OLS/ols.js'></SCRIPT>

As an example of procedures to load the applicable page style sheet information and to place the appropriate footer, applications 450 may call an "init( . . . )" procedure after including ols.js by adding: "<SCRIPT>init('APP_NAME'); </SCRIPT>" and call "addFooter()" at the point in your document where you want to place your footer: "<SCRIPT>addFooter();</SCRIPT>." By calling init('pageName'), the appropriate style sheet may be automatically loaded for use with the application 450. If the parameter "pageName" is provided with the procedure call, the "pageName" will be highlighted on the navigation bar. By calling procedure "addFooter()," the appropriate footer may be automatically placed onto pages for the application 450.

In at least one embodiment, applications 405 may access several variables or parameters that the multi-entity portal system 100 makes available to applications 450, including: an "e_code" parameter specifying the numeric value of the current Entity Code 410 (e.g. 33), a "seParam" parameter specifying the numeric value of the current Subentity Code 415 (e.g. 1650), a "language" parameter specifying the user's language (e.g. useng), a "currency" parameter specifying the user's currency (e.g. usd), a "country" parameter specifying the user's country (e.g. us), a "color_scheme" parameter specifying the subentity's color scheme (e.g. lightBlue); a "companyName" parameter specifying the subentity's name (e.g. UBS I PaineWebber®), and a "logoPath" parameter specifying the path to the subentity's logo graphic (e.g./OLS/logos/logo_1650.gif). Variables may be included in a similar fashion, as shown below for the "color_scheme:"

```
<SCRIPT>
    document.write('<img src="/relativeURL/' + color_scheme +'/curv.gif">');
</SCRIPT>
```

Second, each HTML or XML file may use pre-defined styles, or "classes" for fonts and backgrounds for pages associated with an application 450. In at least one embodiment, the customization module 302 may use style sheets to provide a common look-and-feel across certain applications 450. Each subentity (which may represent a company or group) may have its own associated style sheet. Some of the HTML elements defined in the style sheets may specify particular colors, fonts, account table headers, etc. In at least one embodiment, all applications 450 that operate in conjunction with the multi-entity portal system 100 may use a common style sheet contained in a "stylesheet" file. The "stylesheet" file may be installed on each computing platform of server system 101, or otherwise made accessible to the application server(s) or web server(s) on which the applications 450 execute. In at least one embodiment, the common "stylesheet" file may provide background page characteristics while each entity (associated with an Entity Code 405) provides a tentative URL link to a set of one or more additional style sheet files providing further page characteristics. In such embodiments, to access the style sheet file, the application code instructions may include the javascript file ols.js in all HTML pages. This javascript file may identify which stylesheet to load based on Subentity Code 415, which may be specified in the URL.

Figure 10:
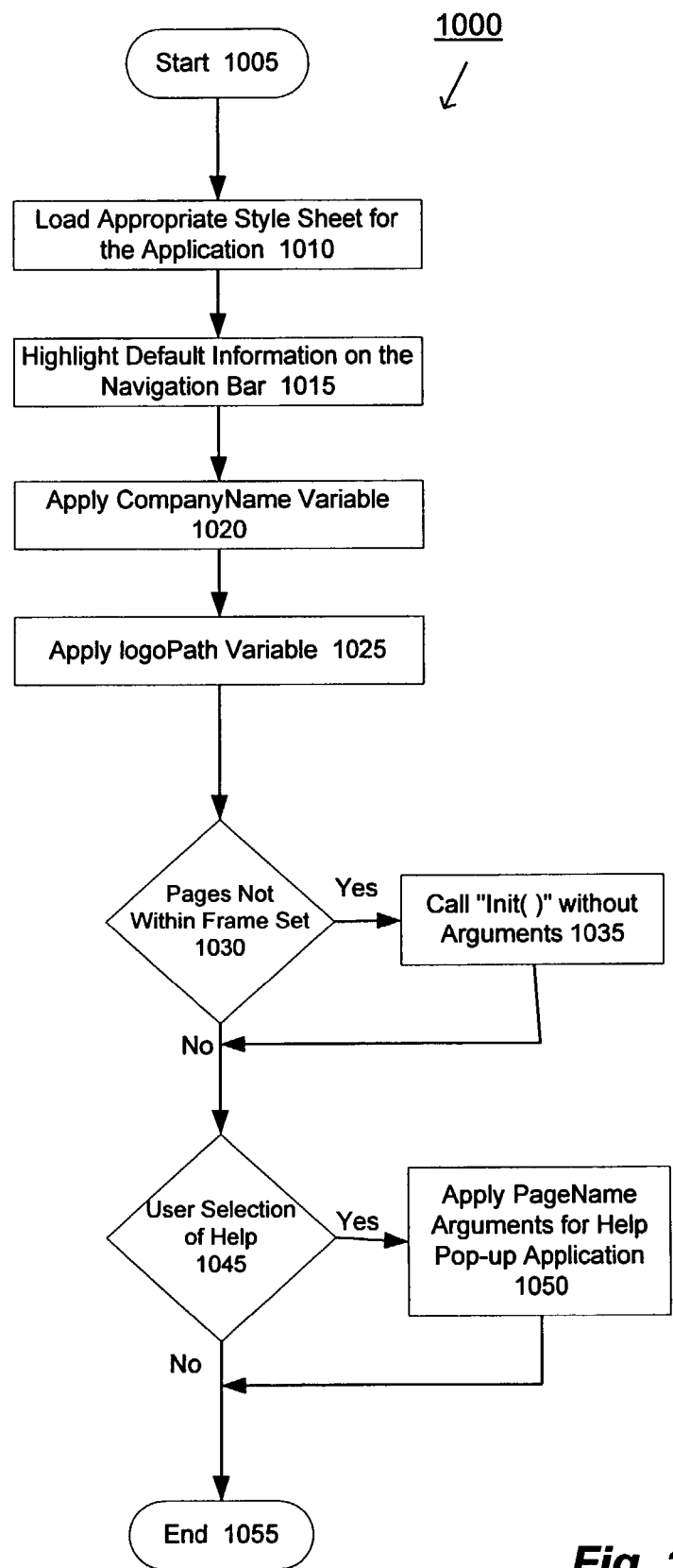
FIG. 10 illustrates a page initialization process in accordance with at least one embodiment.

In at least one embodiment, the "ols.js" file may include an "init(pageName)" function for initializing pages and an "addFootero" function for including a footer on pages. The initializing function may be used to specify a particular page to output upon startup initialization of an application 450. FIG. 10 illustrates a page initialization method in accordance with at least one embodiment. For example, by calling "init('accSumm')," the following actions may occur, commencing at 1005:

1) The appropriate style sheet may be automatically loaded at 1010. The application 450 may now use of the styles from the associated common style sheet for pages output in conjunction with that application 450.

2) Because the value 'accSumm' was provided as an argument within the function call, the "Account Summary" (in this example) may be highlighted on the navigation bar at 1015.

3) The application 450 may use the companyName variable at 1020.

4) The application 450 may use the logoPath variable at 1025.

5) For pages that are not within a frame set at 1030, the application 450 may call "init()" with no arguments at 1035.

6) A "pageName" argument may be provided as an option for certain purposes. For example, at 1045 a "Help" pop-up application could use the "pageName" argument because clicking the "Help" link causes a pop-up window at 1050 that does not affect the navigation bar.

7) Page initialization processing may end at 1055.

In at least one embodiment, all applications 450 may have certain common characteristics using this approach. For instance, all applications 450 may use footers and style sheets. Furthermore, the multi-entity portal system 100 may provide to applications 450 the ability to initialize several items at once such as, but not limited to, footers and style sheets. This may be accomplished by an application 450 making a few JavaScript function calls to accomplish: import of their style sheet file (e.g., a ".css" file); placing their footer onto the page; using a JavaScript variable providing an organization name (e.g., "companyName") at any point in the application 450 code; using a JavaScript variable such as "logoPath" at any point in the application 450 code to display the path to their company's logo graphic (e.g./OLS/logos/logo_1650.gif); providing navigation bar highlighting; and setting the account number in the navigation frame. In at least one embodiment, an application 450 may accomplish these functions by including "ols.js" exactly once per application 450 file as follows:

1) At the top of the <HEAD>portion of the page, include this line: <SCRIPT LANGUAGE='JavaScript' SRC=/OLS/ols.js></SCRIPT>

2) Directly after the line above, include the following to call the "init( . . . )" function and the "setAccount Number( . . . )" function: <SCRIPT>init('YOUR PAGE NAME HERE'); </SCRIPT>

The multi-entity portal system 100 may further include a site map for output upon user selection of, for example, an associated hyperlink provided for this purpose on pages associated with an application 450. A site map may include one or more information headings for different categories of user-selectable information as well as one or more information request links associated with each information heading. In at least one embodiment, user selection of an information request link (using, for example, the pointing device 230) may cause the client portion of the user interface module 303 to transmit an HTML or XML formatted message to the server side user interface module 303 at the server system 101 requesting output of an interactive page containing the requested information. Upon receiving the request message, the user interface module 303 may obtain the requested information, which may involve interacting with the database server 106 to obtain it, and build an interactive page incorporating the requested information in accordance with the style and business rules associated with the user's Subentity Code 415. The user interface module 303 may then transmit the interactive page formatted in accordance with the HTML or XML protocol, via the network 103, to the terminal 102 for rendering and output of the requested interactive page.

The site map may map to the navigation and sub-navigation presented to the client user on the navigation bar of an interactive page. The user interface module 303 may build the associated page dynamically based on the UserID, HashedUserID, ClientSegment, E, SE, LC, CC, and UF parameters passed, for example, within a URL. In at least one embodiment, the user interface module 303 may provide the site map according to the following syntax for the corresponding parameters passed by the application 450.

/OLS/servlet/SiteMap_d?UserID=POA03T2M88K&
HashedUserID =bf2c46f43b8963e98e8731306fc
51087&symb=&navbar=delayed&RTQ=&
AcctNum=&Month=&appName=&
ClientSegment=GEN%2CBLY%2CRTQ&
USAID=&fE=&SE=&LC=&CC=& UF Furthermore, a user may cause the multi-entity application 300 to update the information contained in a particular page of an application 450 by, for example, selecting the refresh button on the navigation bar of the page. In at least one embodiment, user selection of the refresh button may request the user interface module 303 (via the network 103, for example) to reload the current content on the application content frame. However, in order to have the refresh feature work correctly and consistently between Netscape® and Internet Explorer® browsers, all applications may not use frames within the content frame.

In at least one embodiment, the multi-entity portal system 100 may provide certain informational pages as a service accessible by an application 450. For example, the user interface module 303 may provide applications 450 the capability to provide an account summary page. For example, an application 450 may request output of an account summary page according to the following syntax for the corresponding parameters passed by the application 450:

/OLS/servlet/AccountSummary?UserID=xxx&Hash
edUserID=yyy& symb=&navbar=delayed&RTQ=&
AcctNum=& Month=&appName=&ClientSegment=
GEN%2CBLY%2CRTQ& USAID=&TabName=
AccSumm&E=& SE=&LC=&CC=&UF=

A further example of an information page which may be provided by the multi-entity portal system 100 and accessible by an application 450 is a financial advisor contact page that includes useful information such as name, branch address, branch phone number, and e-mail address for a client's financial advisor. In at least one embodiment, an application 450 may request output of a financial advisor page according to the following syntax for the corresponding parameters passed by the application 450:

/OLS/servlet/AccountSummary?UserID=xxx&
   HashedUserID=yyyyy& symb=&navbar=delayed&
   RTQ=&AcctNum=& Month=&appName=& Client-
   Segment—GEN%2CBLY%2CRTQ&
   USAID=&E=&SEC=&LC=&CC=& UF=

Another example of an information page which may be provided by the multi-entity portal system 100 and accessible by an application 450 is a formatted display of client selected ticker symbols and their market price. In at least one embodiment, an application 450 may request output of a ticker symbol price page according to the following syntax for the corresponding parameters passed by the application 450, for a Pop-up with 15 minute auto refresh:

/OLS/servlet/WatchListPopUpFramesetServlet?Use
   rID=POA03T2M88K&HashedUserID=
   bf2c46f43b8963e98e8731306fc51087&symb=&
   navbar=delayed&RTQ=&AcctNum=&Month=&
   appName=&ClientSegment=
   GEN%2CBLY%2CRTQ&USAID=&E=&SE=&
   LC=&CC=& UF=

Another example of an information page which may be provided by the multi-entity portal system 100 for an application 450 is a frequently asked questions (FAQ) page. In at least one embodiment, the FAQ page may refer to individual FAQ sections provided by groups of applications 450. The content displayed on the FAQ application may be based on the "ClientSegment" code in conformance with an FAQ style guide. For different Entity Code 405 and Subentity Code 415 parameters, the FAQ may have a different look and feel. In at least one embodiment, an application 450 may request output of a FAQ page according to the following syntax for the corresponding parameters passed by the application 450:

/OLS/servlet/HelpFAQServlet?UserID=xxx&Hashe
   dUserID=yyyyy&
   symb=&navbar=delayed&AcctNum=&Month=&
   appName=&ClientSegment=GEN%2CBLY%2CRTQ&
   USAID=&E=&SEC=&LC=&CC=&UF=

In at least one embodiment, the user interface module 303 may construct an appropriate list of FAQ questions based on the "ClientSegment" code such that there will not be questions about applications 450 that the client user cannot access or to which the client user is not entitled by his constituency. A particular group of applications 450 which has specific FAQ's may provide them to the multi-entity portal system 100 in the form of HTML or XML documents containing only the questions and answers for that application 450 group. In these embodiments, each HTML or XML file may contain an agreed upon link specific to the application 450 group. Each application 450 group may be assigned a particular link name.

Another example of an information page which may be provided by the multi-entity portal system 100 for an application 450 is a Help page. In at least one embodiment, the Help page may be prepositioned for the application 450 and stored, for example, using the applications 450 database. A URL link to access the Help page may be made available to the user interface module 303. The Help page file itself may be located on the portion of server system 100 hosting the associated application 450, which may be an application server. The multi-entity portal system 100 may provide different subentities (e.g., companies) with different content, look, and feel for their pages. The UserId, HashedUserId, appName, E, SE, and LC parameters, passed to the help servlet, may determine which specific help pages to output. The Help application launched by the user interface module 303 may be a pop-up help window that allows the client user to navigate to any of the application help sections. The user interface module 303 may output different help sections based on the Subentity Code 415, language, and the client entitlements. In at least one embodiment, the client user may see a pop-up window showing the appropriate help sections based on the client's entitlements. The client may be able to navigate to all other help sections (to which he is entitled) for the entire multi-entity portal system 100 and its applications 450. In at least one embodiment, an application 450 may request output of a Help page according to the following syntax for the corresponding parameters passed by the application 450:

/OLS/servlet/HelpNavbarServlet?UserID=xxx
   &HashedUserID=yyyy&ClientSegment=GEN,
   BLY&appName=&TabName=Home&
   E=ubs&SE=&LC=&CC=& UF In summary, an application 450 may implement the following code instructions to permit the application 450 to be used with the multi-entity portal system 100. In order to invoke the dynamic style sheets and tab highlighting in the navigation frame as discussed above, in the header portion of application 450 HTML or XML file, the following code statements may be included:

<SCRIPT LANGUAGE='JavaScript' SRC='/OLS/ols.js'></SCRIPT>
   <SCRIPT>init('APP_NAME'); </SCRIPT>

In order to provide a third tier navigation menu, the following code statements may be included in the application 450 HTML or XML file:

<SCRIPT LANGUAGE='JavaScript'>
   SRC='/OLS/thirdTMenuItemsProfile.js'>getDataArray
     (seParam);
   </SCRIPT>

In order to provide desired footer information in output pages, first call the "init( . . . )" method of "ols.js." Then, in the place where footer is to appear, the following code statements may be included in the application 450 HTML or XML file:

<SCRIPT>addFooter(); </SCRIPT>

In at least one embodiment, the multi-entity portal system 100 may provide at least two types of images for inclusion in pages of applications 450. First, the user interface module 303 may provide images that are shared by (or accessible to) all applications 450 regardless of Subentity Code 415. Example file names may include "pix.gif" and "curv.gif" files. Shared files may have the same color for all subentities. In at least one embodiment, the shared files may be stored in an "/OLS/images/" directory maintained in the applications database 105. To include these images, an application 450 may simply point to the corresponding directory. An example of an application code instruction for accomplishing this is:

<img src=/OLS/images/pix.gif>

A second type of image provided by the multi-entity portal system 100 is a set of subentity images that change a display characteristic such as, for example, their color, in conformance with each subentity's color scheme. In at least one embodiment, these images may be contained in subdirectories named by their color such as blue, red, beige, etc. stored using the applications database 105. Further, in some embodiments these subdirectories may be contained in the "/OLS/images/contentImages/" directory stored using the applications database 105. To include these images, an application 450 may use a variable (e.g., a "color_scheme" variable, which may be set by the "init()" function of the "ols.js" Javascript. An example of an application code instruction for accomplishing this is:

```
<SCRIPT>
    document.write('<img src="/OLS/images/contentImages/" +
color_scheme +'/curv.gif">');
</SCRIPT>
```

The multi-entity portal system 100 may further provide one or more variables that are accessible by applications 450. To access these variables (e.g. e_code, seParam, language, currency, companyName, country, logoPath, or color_scheme), the application 450 may first call the "init( . . . )" method of "ols.js," and then include an application code instruction to access the particular variable. For example, the exemplary instructions below allow an application 450 to access the "companyName" variable and display it to the screen:

```
<SCRIPT LANGUAGE='JavaScript'>
    var hs = "The company name for this SE parameter is: " + companyName + ";
    documant.write(hs);
</SCRIPT>
```

Thus, embodiments of a multi-entity portal system have been shown that provide access by a constituency group of users to a set of entitled applications based on a subentity code, and allow business units to provide on-line services to their clients without need to develop independent and completely new on-line services platforms, thereby avoiding the associated costs.

While embodiments of the invention have been described above, it is evident that many alternatives, modifications and variations will be apparent to those skilled in the art. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents.

What is claimed is:

1. A system for providing Internet service to multiple businesses, each business including multiple services of different types, a first one of the businesses including at least first and second ones of the services, and a second one of the businesses including at least the first service, the system comprising:

a server system supporting a plurality of computer-based applications, the server system being coupled to a network that communicates with at least one terminal at one of the services in each of the businesses; and a database coupled to the server system, the database storing a plurality of first codes, each of said first codes identifying a respective one of the businesses, the database further storing a plurality of second codes, each of said second codes identifying a respective service, the database further storing a plurality of user identifiers, each said user identifier being associated with a particular user in a respective one of the services at a respective one of the businesses, whereby each user identifier is associated with a respective one of said first codes and with a respective one of said second codes, (A) wherein the server system is responsive to input of one of said user identifiers at a first terminal at the first service at the first business and communicating with the network:

(1) to determine a particular set of said computer-based applications to be a first entitled set of applications and a first set of business rules based upon the second code associated with the first service, (2) to provide user access at the first terminal only to the first entitled set of applications, and (3) to output one or more interactive pages associated with the first entitled set of applications and generated in accordance with the first set of business rules in a first style based on both the first code associated with the first business and the second code associated with the first service to the requesting user at the first terminal, (B) wherein the server system is responsive to input of one of said user identifiers at a second terminal at the first service at the second business and communicating with the network:

(4) to determine a particular set of said computer-based applications to be the first entitled set of applications and the first set of business rules based upon the second code associated with the first service, (5) to provide user access at the second terminal only to the first entitled set of applications, and (6) to output one or more interactive pages associated with the first entitled set of applications and generated in accordance with the first set of business rules in a second style based on both the second code associated with the second business and the first code associated with the first service to the requesting user at the second terminal, and (C) wherein the server system is responsive to input of one of said user identifiers at a third terminal at a second service at the first business and communicating with the network:

(7) to determine a particular set of said computer-based applications to be a second entitled set of applications and a second set of business rules based upon the second code associated with the second service, (8) to provide user access at the third terminal only to the second entitled set of applications, and (9) to output one or more interactive pages associated with the second entitled set of applications and generated in accordance with the second set of business rules in a third style based on both the second code associated with the first business and the first code associated with the second service to the requesting user at the third terminal.

2. The system of claim 1, wherein the server system further comprises:
a customization module that determines the respective style for the interactive pages based upon the first and second codes associated with the input user identifier.

3. The system of claim 2, wherein the customization module determines a common portion of the respective style based on the first code associated with the input user identifier, and further determines a service-unique portion of the style based on the associated second code, wherein the common portion is applied to interactive pages generated for each user identifier associated with that first code and wherein the service-unique portion is applied to interactive pages generated for each user identifier associated with that second code.

4. The system of claim 2, wherein the customization module modifies the respective style in response to user unique page parameters based on the input user identifier.

5. The system of claim 4, wherein said system accepts user modifications to the page parameters and storing updated page parameters in the database.

6. The system of claim 2, wherein the customization module generates a default set of entitled applications if the database is unavailable.

7. A method for providing Internet service to multiple businesses over a system, each business including multiple services of different types, a first one of the businesses including at least first and second ones of the services, and a second one of the businesses including at least the first service,
the system comprising:
a server system supporting a plurality of computer-based applications, the server system being coupled to a network that communicates with at least one terminal at one of the services in each of the businesses; and
a database coupled to the server system, the database storing a plurality of first codes, each of said first codes identifying a respective one of the businesses,
the database further storing a plurality of second codes, each of said second codes identifying a respective service,
the database further storing a plurality of user identifiers, each said user identifier being associated with a particular user in a respective one of the services at a respective one of the businesses, whereby each user identifier is associated with a respective one of said first codes and with a respective one of said second codes,
said method comprising the steps of:
(A) responsive to input of one of said user identifiers at a first terminal at the first service at the first business and communicating with the network:
 (1) determining a particular set of said computer-based applications to be a first entitled set of applications and a first set of business rules based upon the second code associated with the first service,
 (2) providing user access at the first terminal only to the first entitled set of applications, and
 (3) outputting one or more interactive pages associated with the first entitled set of applications and generated in accordance with the first set of business rules in a first style based on both the first code associated with the first business and the second code associated with the first service to the requesting user at the first terminal,
(B) responsive to input of one of said user identifiers at a second terminal at the first service at the second business and communicating with the network:
 (4) determining a particular set of said computer-based applications to be the first entitled set of applications and the first set of business rules based upon the second code associated with the first service,
 (5) providing user access at the second terminal only to the first entitled set of applications, and
 (6) outputting one or more interactive pages associated with the first entitled set of applications and generated in accordance with the first set of business rules in a second style based on both the second code associated with the second business and the first code associated with the first service to the requesting user at the second terminal, and
(C) responsive to input of one of said user identifiers at a third terminal at a second service at the first business and communicating with the network:
 (7) determining a particular set of said computer-based applications to be a second entitled set of applications and a second set of business rules based upon the second code associated with the second service,
 (8) providing user access at the third terminal only to the second entitled set of applications, and
 (9) outputting one or more interactive pages associated with the second entitled set of applications and generated in accordance with the second set of business rules in a third style based on both the second code associated with the first business and the first code associated with the second service to the requesting user at the third terminal.

8. The method of claim 7, wherein the server system further comprises:
a customization module configured to determine the respective style for the interactive pages based upon the first and second codes associated with the input user identifier,
and wherein each of steps (3), (6) and (9) further comprise using the customization module to determine a common portion of the respective style based on the first code associated with the input user identifier, and to determine a service-unique portion of the style based on the associated second code, wherein the common portion is applied to interactive pages generated for each user identifier associated with that first code and wherein the service-unique portion is applied to interactive pages generated for each user identifier associated with that second code.

9. The method of claim 8, wherein said method uses the customization module to modify the respective style in response to user unique page parameters based on the input user identifier.

10. The method of claim 8, further comprising the step of accepting user modifications to the page parameters and storing updated page parameters in the database.

11. The method of claim 7, further comprising the step of generating a default set of entitled applications if the database is unavailable.

12. A computer-readable medium upon which is embodied a set of programmable instructions that when executed cause a processor on-line to perform a method for providing Internet service to multiple businesses over a system, each business including multiple services of different types, a first one of the businesses including at least first and second ones of the services, and a second one of the businesses including at least the first service,
the system comprising:
a server system supporting a plurality of computer-based applications, the server system being coupled to a network that communicates with at least one terminal at one of the services in each of the businesses; and a database coupled to the server system, the database storing a plurality of first codes, each of said first codes identifying a respective one of the businesses, the database further storing a plurality of second codes, each of said second codes identifying a respective service, the database further storing a plurality of user identifiers, each said user identifier being associated with a particular user in a respective one of the services at a respective one of the businesses, whereby each user identifier is associated with a respective one of said first codes and with a respective one of said second codes, said method comprising the steps of:

(A) responsive to input of one of said user identifiers at a first terminal at the first service at the first business and communicating with the network:
  (1) determining a particular set of said computer-based applications to be a first entitled set of applications and a first set of business rules based upon the second code associated with the first service,
  (2) providing user access at the first terminal only to the first entitled set of applications, and
  (3) outputting one or more interactive pages associated with the first entitled set of applications and generated in accordance with the first set of business rules in a first style based on both the first code associated with the first business and the second code associated with the first service to the requesting user at the first terminal, (B) responsive to input of one of said user identifiers at a second terminal at the first service at the second business and communicating with the network:
  (4) determining a particular set of said computer-based applications to be the first entitled set of applications and the first set of business rules based upon the second code associated with the first service,
  (5) providing user access at the second terminal only to the first entitled set of applications, and
  (6) outputting one or more interactive pages associated with the first entitled set of applications and generated in accordance with the first set of business rules in a second style based on both the second code associated with the second business and the first code associated with the first service to the requesting user at the second terminal, and (C) responsive to input of one of said user identifiers at a third tenninal at a second service at the first business and communicating with the network:
  (7) determining a particular set of said computer-based applications to be a second entitled set of applications and a second set of business rules based upon the second code associated with the second service,
  (8) providing user access at the third terminal only to the second entitled set of applications, and
  (9) outputting one or more interactive pages associated with the second entitled set of applications and generated in accordance with the second set of business rules in a third style based on both the second code associated with the first business and the first code associated with the second service to the requesting user at the third terminal.

* * * * *